(12) United States Patent
Chon et al.

(10) Patent No.: US 11,895,320 B2
(45) Date of Patent: Feb. 6, 2024

(54) HISTORY-BASED MOTION VECTOR PREDICTION

(71) Applicants: Beijing Bytedance Network Technology Co., Ltd., Beijing (CN); Bytedance Inc., Los Angeles, CA (US)

(72) Inventors: Jaehong Chon, San Diego, CA (US); Hsiao Chiang Chuang, San Diego, CA (US); Li Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 221 days.

(21) Appl. No.: 17/486,312

(22) Filed: Sep. 27, 2021

(65) Prior Publication Data

US 2022/0014782 A1  Jan. 13, 2022

Related U.S. Application Data

(63) Continuation of application No. PCT/CN2020/081362, filed on Mar. 26, 2020.

(51) Int. Cl.
  *H04N 19/52* (2014.01)
  *H04N 19/105* (2014.01)
  (Continued)

(52) U.S. Cl.
  CPC .......... *H04N 19/52* (2014.11); *H04N 19/105* (2014.11); *H04N 19/174* (2014.11);
  (Continued)

(58) Field of Classification Search
  CPC .... H04N 19/52; H04N 19/542; H04N 19/176; H04N 19/70; H04N 19/96; H04N 19/174; H04N 19/109
  See application file for complete search history.

(56) References Cited

U.S. PATENT DOCUMENTS 9,491,461 B2  11/2016  Chen et al.
9,549,180 B2  1/2017  Chen et al.
(Continued)

FOREIGN PATENT DOCUMENTS

CN  103338372 A  10/2013
CN  105678808 A  6/2016
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Kathleen V Nguyen
(74) *Attorney, Agent, or Firm* — Perkins Coie LLP

(57) ABSTRACT

History based motion vector prediction is disclosed. In one example method of video processing, initializing, for a conversion between a first region of video and a bitstream of the first region, a first history motion vector predictor (HMVP) table associated with the first region based on at least one of stored multiple HMVP tables, the multiple HMVP tables being used to store motion information associated with regions coded prior the first region; and performing the conversion by using the initialized first HMVP table which includes at least one motion candidate.

20 Claims, 30 Drawing Sheets

(51) Int. Cl.
H04N 19/174 (2014.01)
H04N 19/426 (2014.01)
H04N 19/436 (2014.01)
H04N 19/543 (2014.01)
H04N 19/70 (2014.01)
H04N 19/96 (2014.01)

(52) U.S. Cl.
CPC ......... *H04N 19/426* (2014.11); *H04N 19/436* (2014.11); *H04N 19/543* (2014.11); *H04N 19/70* (2014.11); *H04N 19/96* (2014.11)

(56) References Cited

U.S. PATENT DOCUMENTS

| | | | |
|---|---|---|---|
| 9,674,542 | B2 | 6/2017 | Chen et al. |
| 10,021,414 | B2 | 7/2018 | Seregin et al. |
| 10,045,014 | B2 | 8/2018 | Zhang et al. |
| 10,412,387 | B2 | 9/2019 | Pang et al. |
| 10,448,010 | B2 | 10/2019 | Chen et al. |
| 10,455,231 | B2 | 10/2019 | Xu et al. |
| 10,602,180 | B2 | 3/2020 | Chen et al. |
| 10,757,420 | B2 | 8/2020 | Zhang et al. |
| 10,779,002 | B2 | 9/2020 | Chen et al. |
| 10,834,419 | B2 | 11/2020 | Joshi et al. |
| 10,841,609 | B1 | 11/2020 | Liu et al. |
| 10,880,547 | B2 | 12/2020 | Xu et al. |
| 2013/0329007 | A1 | 12/2013 | Zhang et al. |
| 2014/0092968 | A1 | 4/2014 | Guillemot et al. |
| 2015/0036741 | A1 | 2/2015 | Yie et al. |
| 2015/0163506 | A1 | 6/2015 | Chon et al. |
| 2017/0280159 | A1 | 9/2017 | Xu et al. |
| 2018/0152711 | A1 | 5/2018 | Sunwoo et al. |
| 2018/0376148 | A1 | 12/2018 | Zhang et al. |
| 2019/0149838 | A1 | 11/2019 | Zhang et al. |
| 2020/0045310 | A1 | 2/2020 | Chen et al. |
| 2020/0169745 | A1* | 5/2020 | Han ................. H04N 19/436 |
| 2020/0221116 | A1 | 7/2020 | Chen et al. |
| 2021/0400258 | A1* | 12/2021 | Li ................... H04N 19/159 |

FOREIGN PATENT DOCUMENTS

| | | |
|---|---|---|
| CN | 106416243 A | 2/2017 |
| CN | 107113424 A | 9/2017 |
| KR | 20180084663 A | 7/2018 |
| WO | 2013168407 A1 | 11/2013 |

OTHER PUBLICATIONS

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-0368, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

Chien et al. "CE8-Related: CPR Mode Signaling and Interaction with Inter Coding Tools," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0483, 2019.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0142, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

Sethuraman, Sriram. "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.

Tsai et al. "CE1.2.1: Constraint for Binary and Ternary Partitions," Joint Video Experts Team (JVET)of ITU-T SG 16 WP 3 and ISO/IEC JTC 1/SC 29/WG 1112th Meeting: Macao, CN, Oct. 3-12, 2018, document JVET-L0081, 2018.

Zhang et al. "CE4: History-based Motion Vector Prediction (Test 4.4.7)," Joint Video Experts Team (JVET)of ITU-T SG 16 WP 3 and ISO/IEC JTC 1/SC 29/WG 1112th Meeting: Macao, CN, Oct. 3-12, 2018, document JVET-L0266, 2018.

http://phenix.it-sudparis.eu/jvet/doc_end_user/current_document.php?id=5755.

https://vcgit.hhi.fraunhofer.de/jvet/VVCSoftware_VTM/tags/VTM-4.0rc1.

VTM-4.0: https://vcgit.hhi.fraunhofer.de/jvet/VVCSoftware_VTM/.

JEM-7.0: https://jvet.hhi.fraunhofer.de/svn/svn_HMJEMSoftware/tags/ HM-16.6-JEM-7.0.

International Search Report and Written Opinion from PCT/CN2020/081362 dated May 13, 2020 (10 pages).

* cited by examiner

FIG. 20

HISTORY-BASED MOTION VECTOR PREDICTION

CROSS-REFERENCE TO RELATED APPLICATION

This application is a continuation of International Patent Application No. PCT/CN2020/081362, filed on Mar. 26, 2020, which claims the priority to and benefits of International Patent Application No. PCT/CN2019/079826, filed on Mar. 27, 2019. All of the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding and decoding, and specifically, to using history based motion vector predictors (HMVP) are described. The described methods may be applied to both the existing video coding standards (e.g., High Efficiency Video Coding (HEVC)) and future video coding standards or video codecs.

In one representative aspect, a method of video processing is disclosed. The method includes, during a conversion between a video region and a bitstream representation of the video region, a motion vector predictor (MVP) table is initialized from multiple stored MVP tables. Each of the multiple MVPs includes motion information previously considered during the conversion. The conversion is performed using the MVP table selected from the multiple stored MVP tables In another exemplary aspect, another method of video processing is disclosed. The method includes constructing, during a conversion between a video region and a bitstream representation of the video region, one or more entries of a motion vector predictor (MVP) table from one or more stored MVP tables, wherein each MVP table includes motion information previously considered during the conversion, a flag indicating motion information is inherited from previous MVP table or added in a current region as a new motion information; and performing the conversion using the MVP table selected from multiple stored MVP tables.

In another exemplary aspect, another method of video processing is disclosed. The method includes initializing, for a conversion between a first region of video and a bitstream representation of the first region, a first history motion vector predictor (HMVP) table associated with the first region based on at least one of stored multiple HMVP tables, the multiple HMVP tables being used to store motion information associated with regions coded prior the first region; and performing the conversion by using the initialized first HMVP table which includes at least one motion candidate.

In another exemplary aspect, another method of video processing is disclosed. The method includes generating, for a conversion between a first region of video and a bitstream representation of the first region, a new history motion vector predictor (HMVP) table associated with the first region based on multiple HMVP tables associated with other regions, the multiple HMVP tables being used to store motion information associated with other regions coded prior the first region; and performing the conversion by using the generated new HMVP table which includes at least one motion candidate.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 20 shows an example of intra-picture block copy.

DETAILED DESCRIPTION

Figure 1:
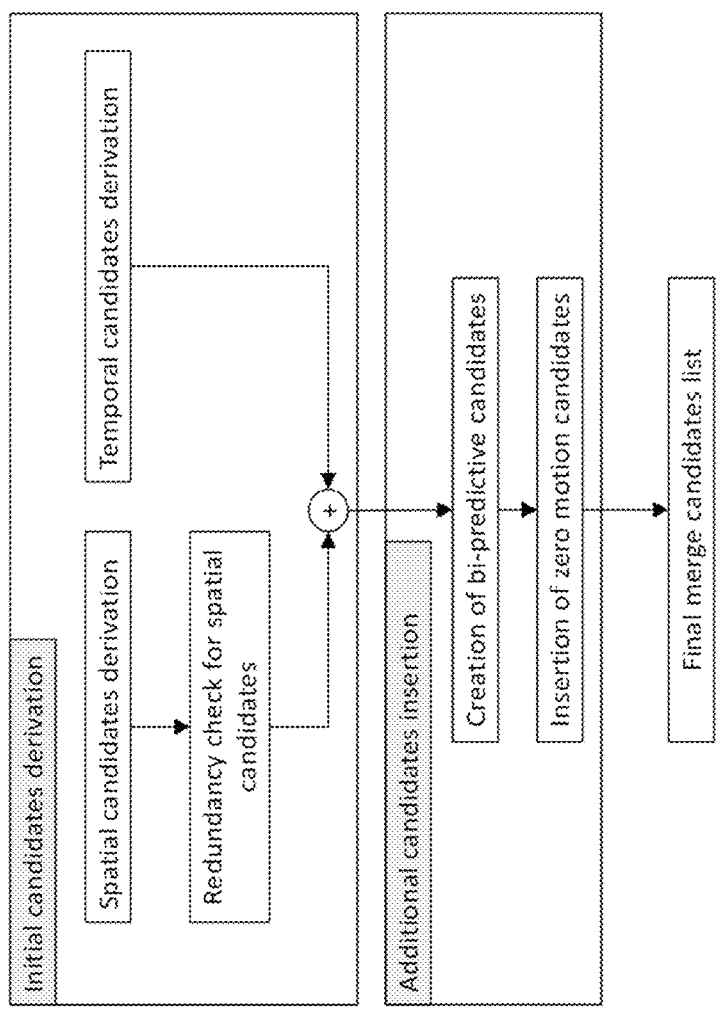
FIG. 1 shows an example of constructing a merge candidate list.

The present document relates to digital video coding and decoding. Section headings are used in the present document only to facilitate understanding, and do not limit scope of the disclosed embodiments in any way. Furthermore, while terminology from current working draft of the H.266 standard is used for reference, the disclosed techniques are equally applicable to other video codec technologies.

1. Brief Summary

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (06/16) and ISO/IEC JTC1 SC29/WG11 (MPEG) was created to work on the VVC standard targeting at 50% bitrate reduction compared to HEVC.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2. Spatial Candidates Derivation

Figure 3:
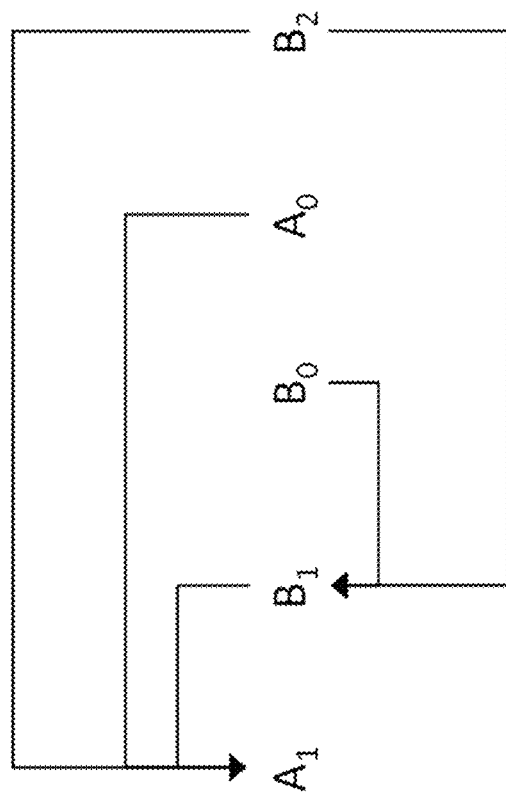
FIG. 3 shows an example of candidate pairs subject to a redundancy check of spatial merge candidates.
Figure 2:
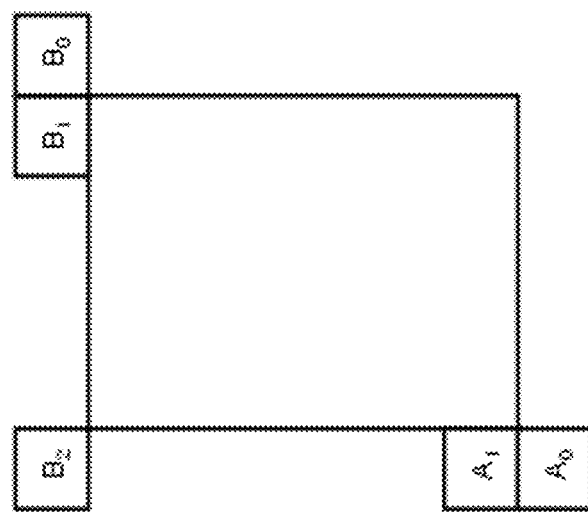
FIG. 2 shows an example of positions of spatial candidates.

In the derivation of spatial merge candidates, a maximum of four merge candidates are selected among candidates located in the positions depicted in FIG. 2. The order of derivation is $A_1, B_1, B_0, A_0$ and $B_2$. Position $B_2$ is considered only when any PU of position $A_1, B_1, B_0, A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information.

2.1.2.2.1 Merge Estimation Region (MER)

Figure 4B:
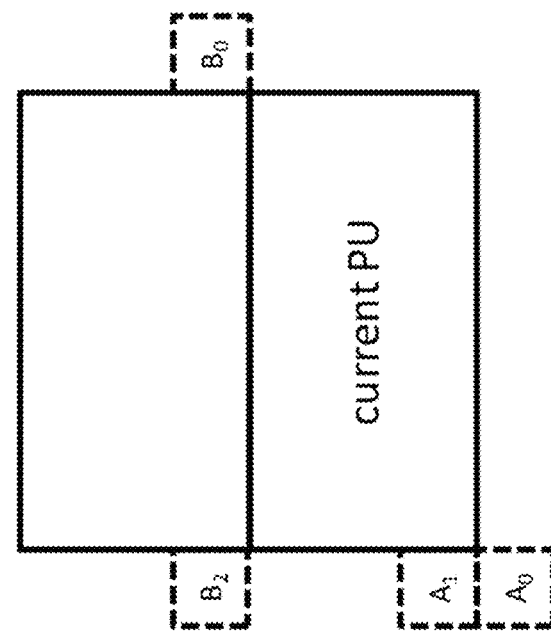
FIGS. 4A and 4B show examples of the position of a second prediction unit (PU) based on the size and shape of the current block.
Figure 4A:
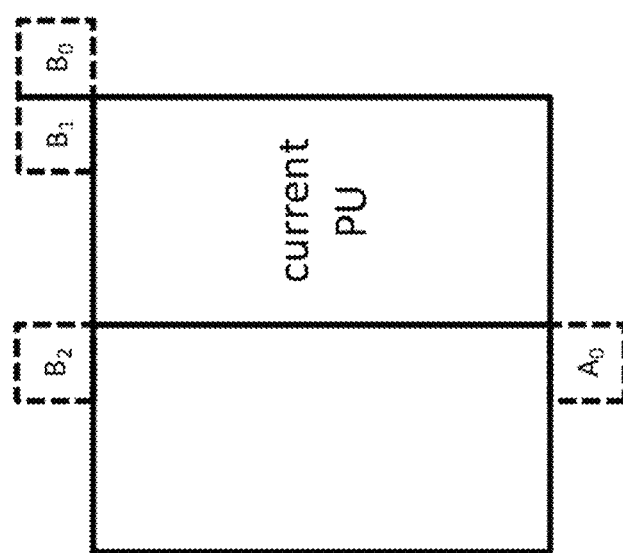

Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

FIG. 4 shows example positions for the second PU of N×2N and 2N×N partitions.

2.1.2.3 Temporal Candidates Derivation

Figure 5:
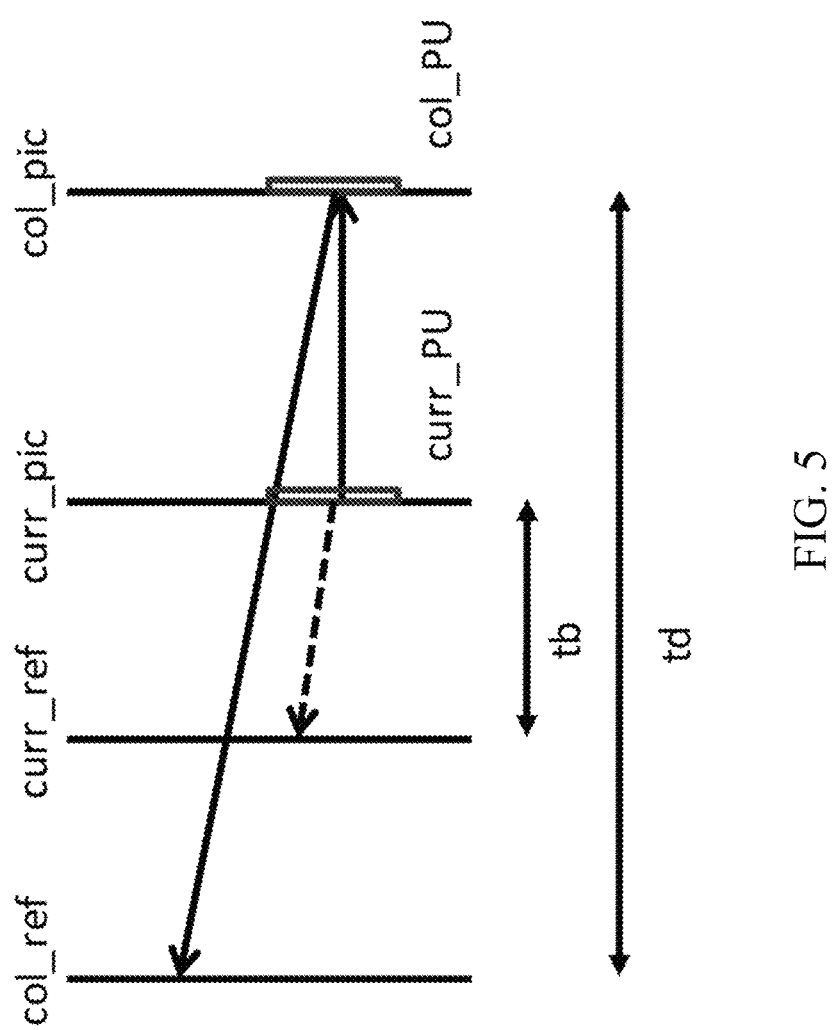
FIG. 5 shows an example of motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
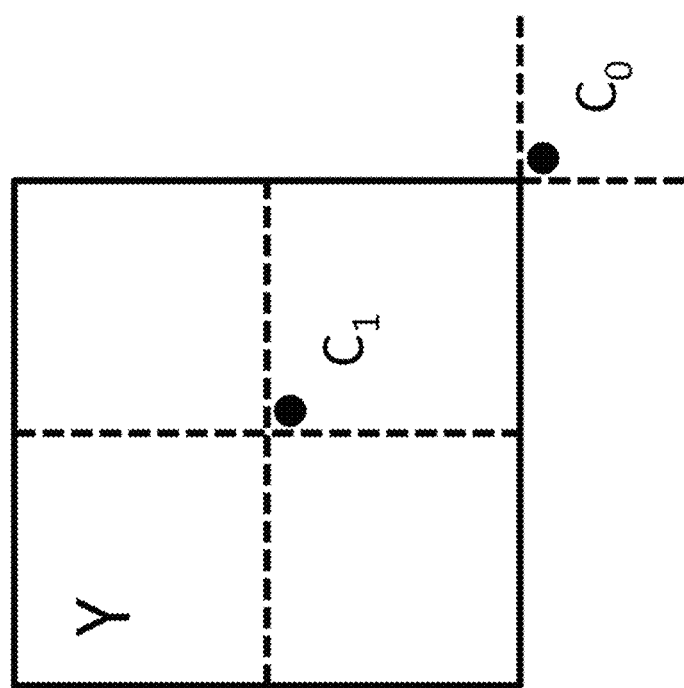
FIG. 6 shows an example of candidate positions for temporal merge candidates.

In the co-located PU (Y) belonging to the reference frame, the position for the temporal candidate is selected between candidates C0 and C1, as depicted in FIG. 6. If PU at position C0 is not available, is intra coded, or is outside of the current coding tree unit (CTU aka. LCU, largest coding unit) row, position C1 is used. Otherwise, position C0 is used in the derivation of the temporal merge candidate.

FIG. 6 shows example candidate positions for temporal merge candidate, C0 and C1.

2.1.2.4 Additional Candidates Insertion

Figure 7:
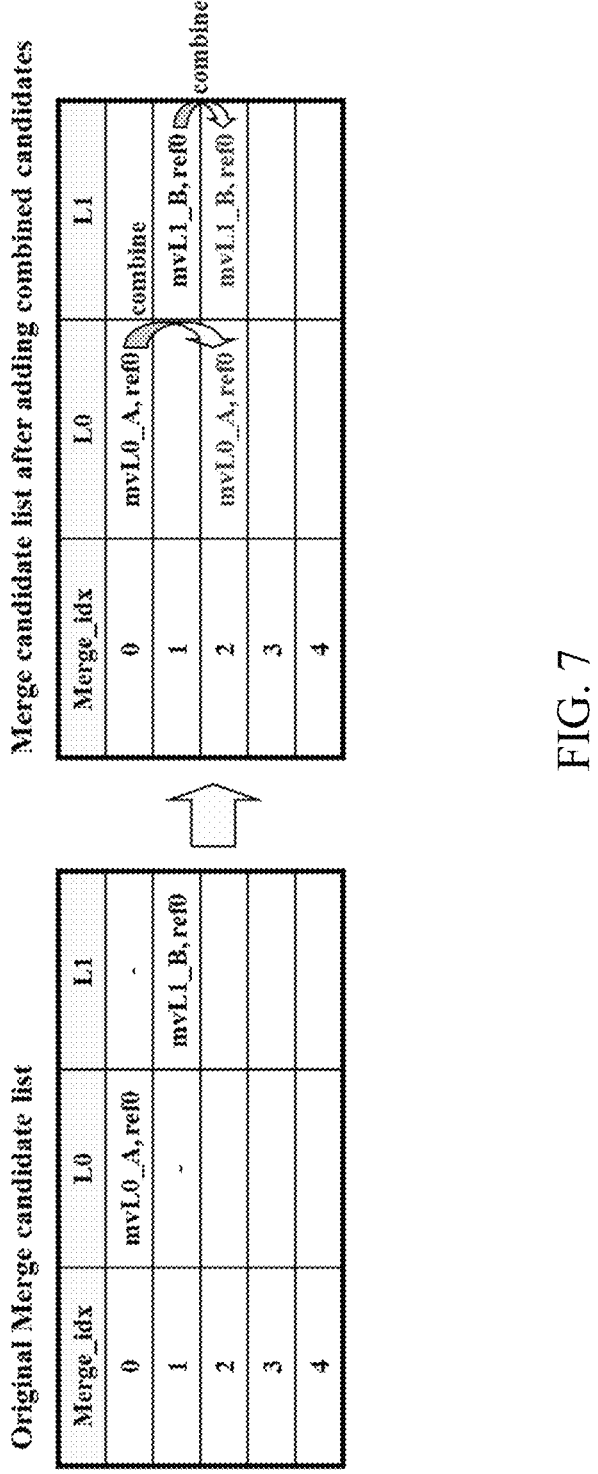
FIG. 7 shows an example of generating a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list.

More specifically, the following steps are performed in order till the merge list is full:

Set variable numRef to either number of reference picture associated with list 0 for P slice, or the minimum number of reference pictures in two lists for B slice;

Add non-repeated zero motion candidates:

For variable i being 0 . . . numRef-1, add a default motion candidate with MV set to (0, 0) and reference picture index set to i for list 0 (if P slice), or for both lists (if B slice).

Add repeated zero motion candidates with MV set to (0, 0), reference picture index of list 0 set to 0 (if P slice) and reference picture indices of both lists set to 0 (if B slice).

Finally, no redundancy check is performed on these candidates.

2.1.3 AMVP

Figure 8:
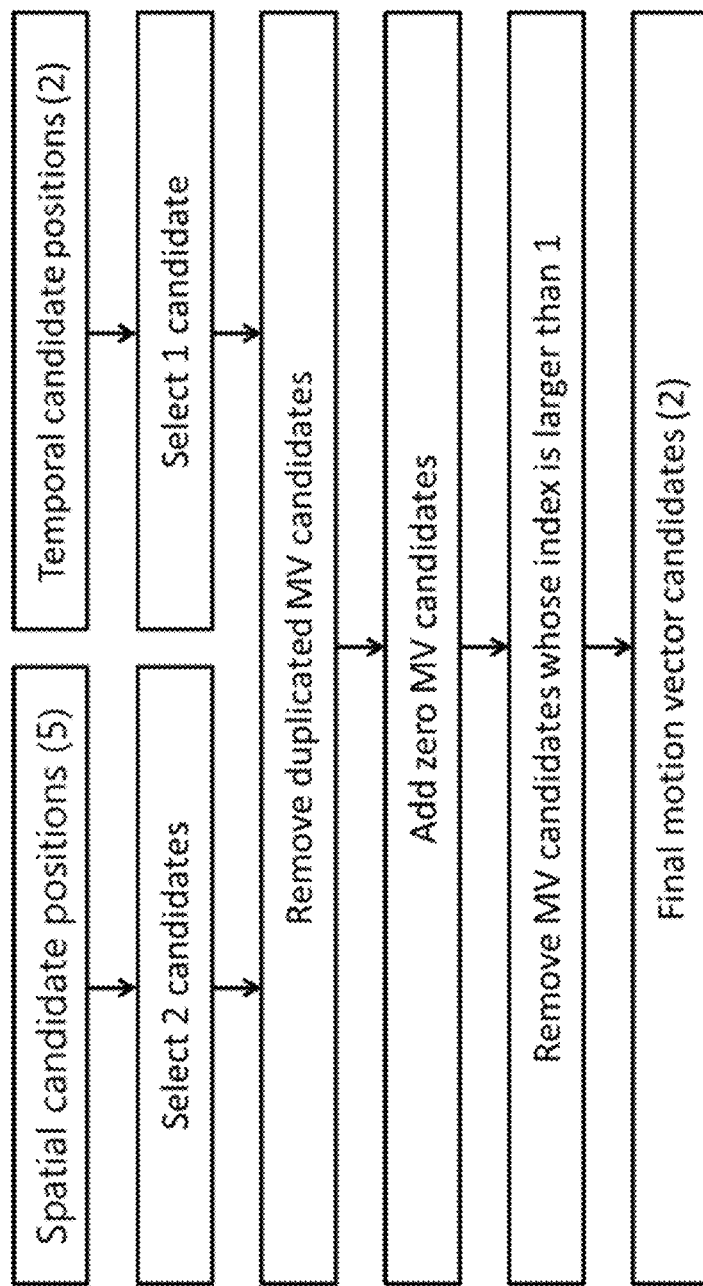
FIG. 8 shows an example of constructing motion vector prediction candidates.

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly, with merge index signalling, the index of the best motion vector candidate is encoded using truncated unary. The maximum value to be encoded in this case is 2 (FIG. 8). In the following sections, details about derivation process of motion vector prediction candidate are provided.

2.1.3.1 Derivation of AMVP Candidates

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
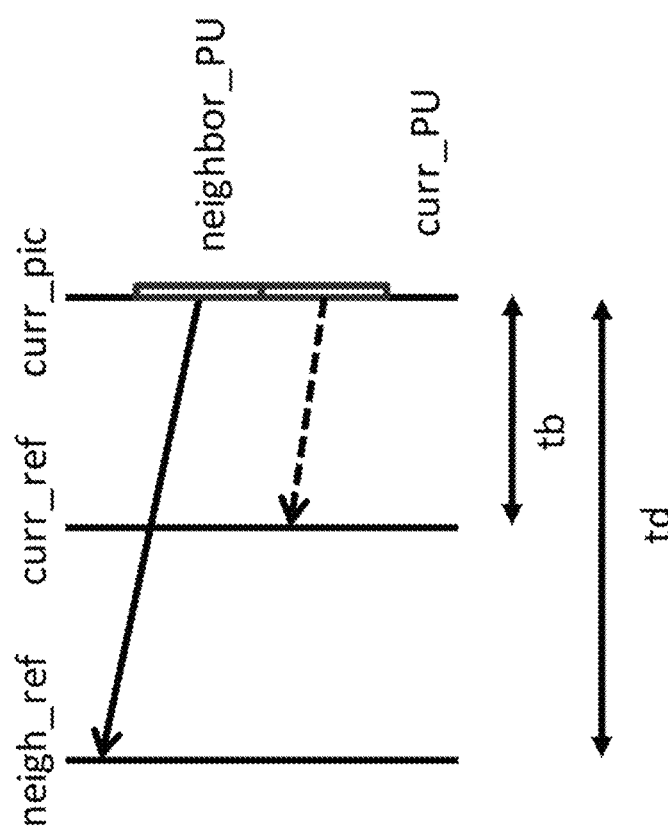
FIG. 9 shows an example of motion vector scaling for spatial motion vector candidates.

FIG. 9 is an illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signaled to the decoder.

2.2 Inter Prediction Methods in VVC

There are several new coding tools for inter prediction improvement, such as Adaptive motion vector difference resolution (AMVR) for signaling MVD for both affine blocks and translational motion blocks, affine prediction mode, Triangular prediction mode (TPM), Alternative TMVP (ATMVP), Generalized Bi-Prediction (GBI), Bi-directional Optical flow (BIO), Intra Block Copy (IBC), etc. al.

2.2.1 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (LAMVR) is introduced.

2.2.1.1 AMVR for Translational Motion Blocks

In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.2.1.2 AMVR for Affine Motion Blocks

Similar to that design for translational motion blocks (aka normal AMVR mode), AMVR mode is extended to affine coded blocks (aka Affine AMVR mode).

For the Affine AMVR mode, three MV/MVD resolutions are supported, that is {1/16, ¼, 1}-pel.

2.2.2 Triangular Prediction Mode

The concept of the triangular prediction mode (TPM) is to introduce a new triangular partition for motion compensated prediction. As shown in FIG. 10, it splits a CU into two triangular prediction units, in either diagonal or inverse diagonal direction. Each triangular prediction unit in the CU is inter-predicted using its own uni-prediction motion vector and reference frame index which are derived from a single uni-prediction candidate list. An adaptive weighting process is performed to the diagonal edge after predicting the triangular prediction units. Then, the transform and quantization process are applied to the whole CU. It is noted that this mode is only applied to merge mode (note: skip mode is treated as a special merge mode).

Figure 10A:
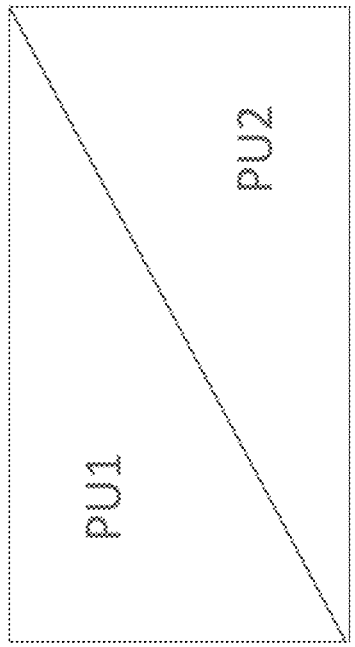
FIGS. 10A-10B show an illustration of splitting a CU into two triangular prediction units (two splitting patterns).

FIG. 10A shows an example of 135 degree partition type (splitting from top-left corner to bottom-right corner).

Figure 10B:
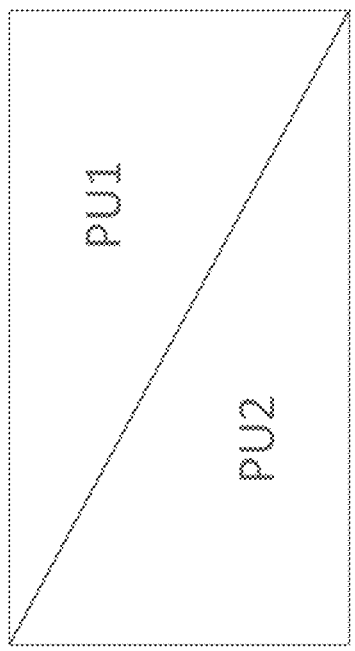

FIG. 10B shows an example of 45 degree splitting patterns.

FIGS. 10A-10B show an illustration of splitting a CU into two triangular prediction units (two splitting patterns).

2.2.2.1 Uni-Prediction Candidate List for TPM

Figure 11:
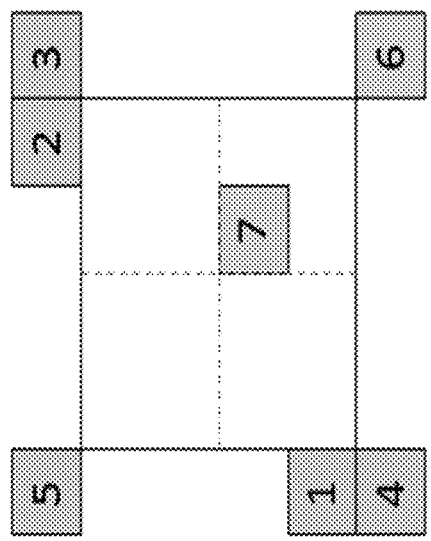
FIG. 11 shows example position of the neighboring blocks.

The uni-prediction candidate list, named TPM motion candidate list, consists of five uni-prediction motion vector candidates. It is derived from seven neighboring blocks including five spatial neighboring blocks (1 to 5) and two temporal co-located blocks (6 to 7), as shown in FIG. 11. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:
1) Obtain regular motion candidates from $A_1$, $B_1$, $B_0$, $A_0$, $B_2$, Col and Col2 (corresponding to block 1-7 in FIG. 11) with full pruning operations when adding a regular motion candidate from spatial neighboring blocks.
2) Set variable numCurrMergeCand=0
3) For each regular motion candidates derived from $A_1$, $B_1$, $B_0$, $A_0$, $B_2$, Col and Col2, if not pruned and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.
Full pruning is applied.
4) For each motion candidates derived from $A_1$, $B_1$, $B_0$, $A_0$, $B_2$, Col and Col2, if not pruned, and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.
Full pruning is applied.
5) For each motion candidates derived from $A_1$, $B_1$, $B_0$, $A_0$, $B_2$, Col and Col2, if not pruned, and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.
Full pruning is applied.
6) For each motion candidates derived from $A_1$, $B_1$, $B_0$, $A_0$, $B_2$, Col and Col2, if not pruned, and numCurrMergeCand is less than 5, if the regular motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.

Full pruning is applied.
7) If numCurrMergeCand is less than 5, zero motion vector candidates are added.

FIG. 11 shows example position of the neighboring blocks.

When inserting a candidate to the list, if it has to be compared to all previously added candidates to see whether it is identical to one of them, such a process is called full pruning.

2.2.2.2 Weighting Process

After predicting each triangular prediction unit, the following weighting process is applied to the diagonal edge between the two triangular prediction units to derive the final prediction for the whole CU. The weighting factor groups are defined as follows:

Weighting factor group: {7/8, 6/8, 5/8, 4/8, 3/8, 2/8, 1/8} and {6/8, 4/8, 2/8} are used for the luminance and the chrominance samples, respectively.

Note that the blending region is dependent on the aspect ratio of the block. For square blocks, width of the weighed pixels are 7 for luma and 3 for chroma as defined above. For rectangular blocks, the width is lengthened by a factor of (W/H) when width is greater than height. Each factor is repeated by (W/H) times before going to the next factor. In case height is greater than width, the width is the same as in square blocks, while they are repeated by (H/W) rows before shifting to the right by one pixel position.

2.2.2.3 Signaling of Triangular Prediction Mode (TPM)

One bit flag to indicate whether TPM is used may be firstly signaled. Afterwards, the indications of two splitting patterns (as depicted in FIG. 10), and selected merge indices for each of the two partitions are further signaled.

2.2.2.3.1 Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

The flag is coded with 3 contexts, based on the following equation:

$$Ctx\ index=((\text{left block } L \text{ available \&\& } L \text{ is coded with } TPM?)1:0)+((\text{Above block } A \text{ available \&\& } A \text{ is coded with } TPM?)1:0);$$

Figure 12:
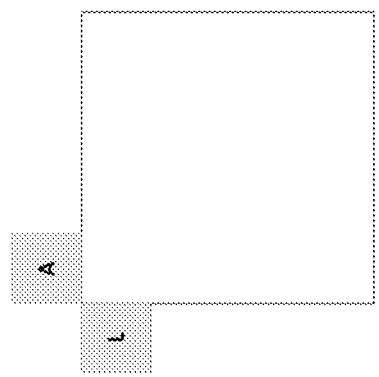
FIG. 12 shows examples of neighboring blocks (A and L) used for context selection in TPM flag coding.

FIG. 12 shows examples of neighboring blocks (A and L) used for context selection in TPM flag coding.

2.2.3 Affine Motion Compensation Prediction

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 13A-13B, the affine motion field of the block is described by two control point motion vectors (CPMVs) for the 4-parameter affine model and 3 CPMVs for the 6-parameter affine model.

Figure 13B:
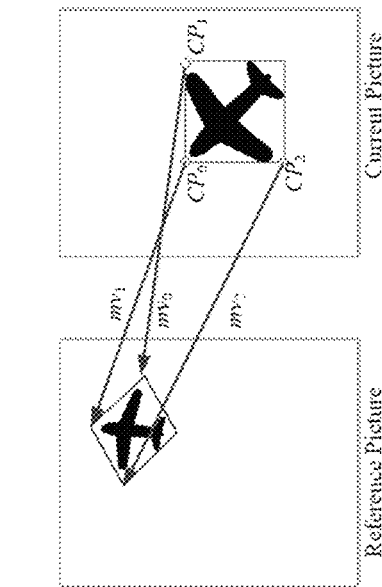
FIG. 13B shows an example of a 6-parameter affine model.
Figure 13A:
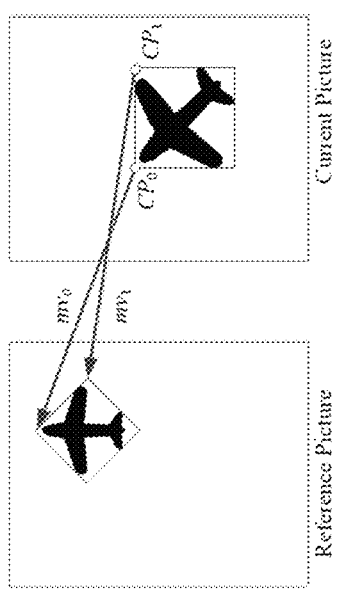
FIG. 13A shows an example of a 4-parameter affine model.

FIG. 13A shows an example of a 4-parameter affine model.

FIG. 13B shows an example of a 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, m^h_0)$ is motion vector of the top-left corner control point, and $(mv^h_1, m^h_1)$ is motion vector of the top-right corner control point and $(mv^h_2, m^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 14:
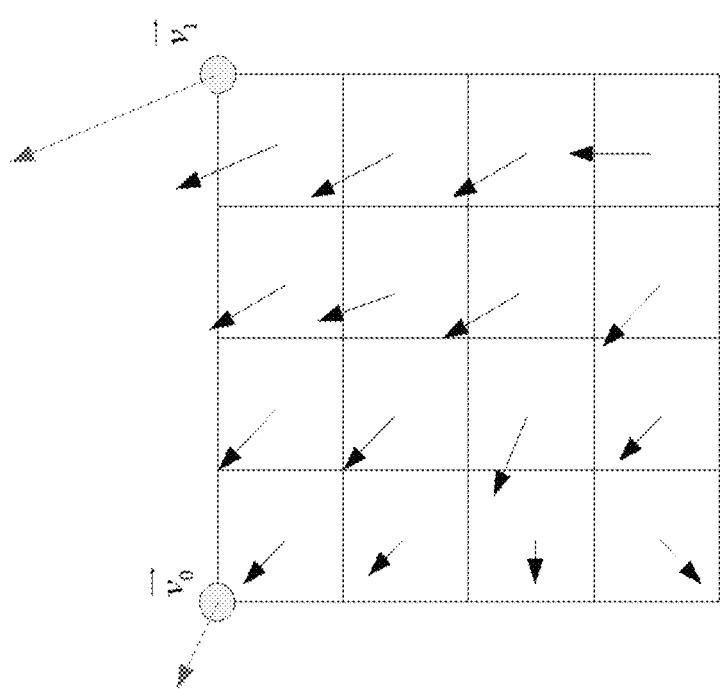
FIG. 14 shows an example of Affine MVF per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 14, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

FIG. 14 shows an example of Affine MVF per sub-block.

After MCP, the high accuracy motion vector of each sub-block is rounded and saved as the same accuracy as the normal motion vector.

2.2.3.1 Signaling of Affine Prediction

Similar to the translational motion model, there are also two modes for signaling the side information due affine prediction. They are AFFINE_INTER and AFFINE_MERGE modes.

2.2.3.2 AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 17) and the estimated CPMVs are signalled. In addition, the index of affine AMVP candidate from which the estimated CPMVs are derived is further signalled.

1) Inherited Affine Motion Predictors

Figure 16:
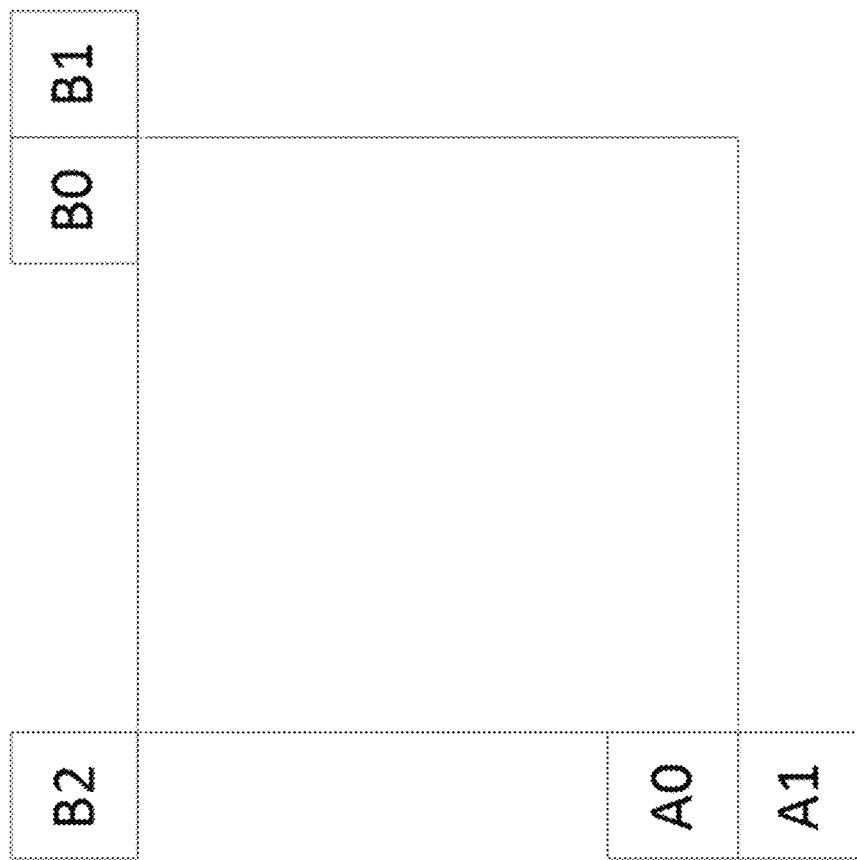
FIG. 16 shows an example of motion vector prediction for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 16.

Figure 18A:
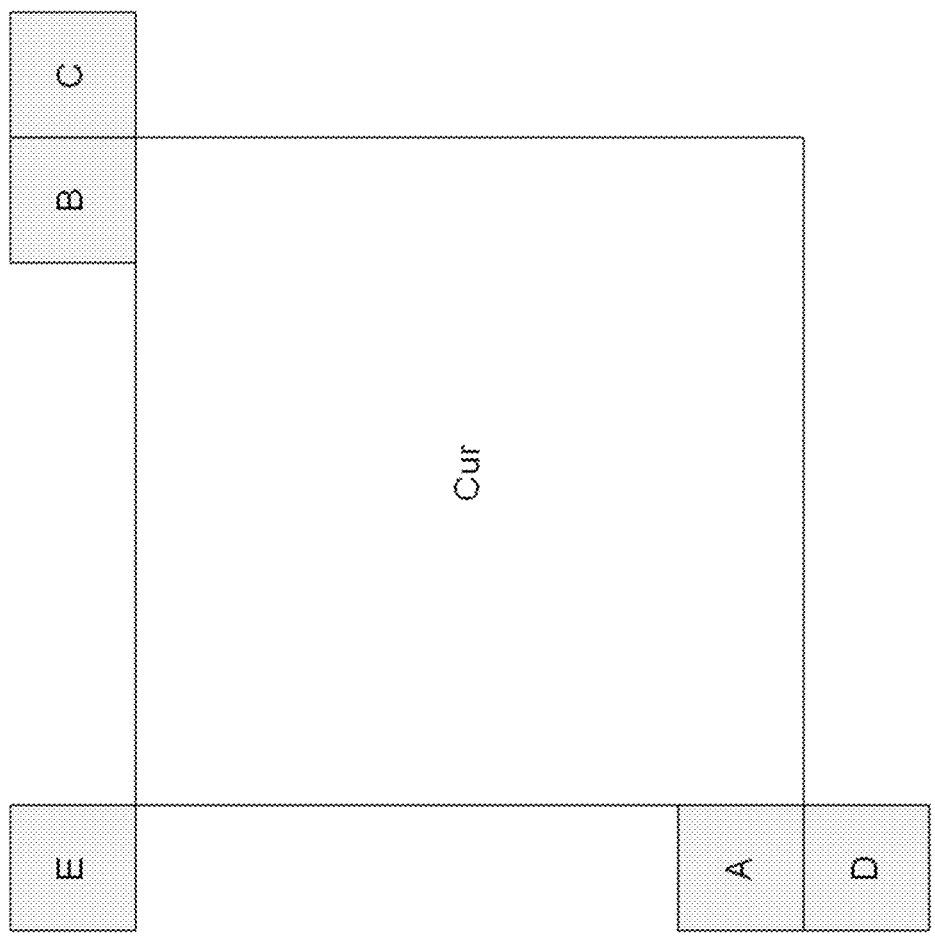
FIGS. 18A and 18B show example candidates for the AF_MERGE affine motion mode.
Figure 18B:
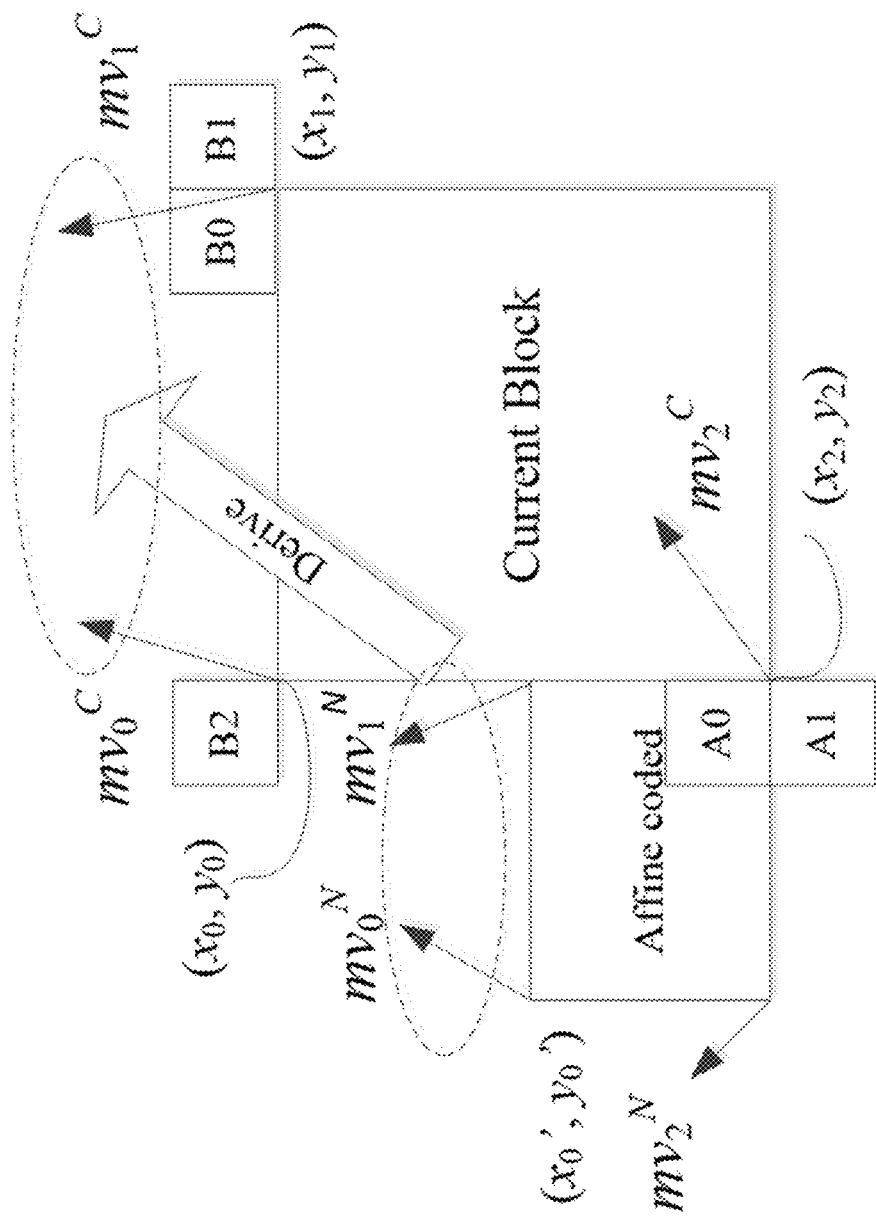

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 18B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 17:
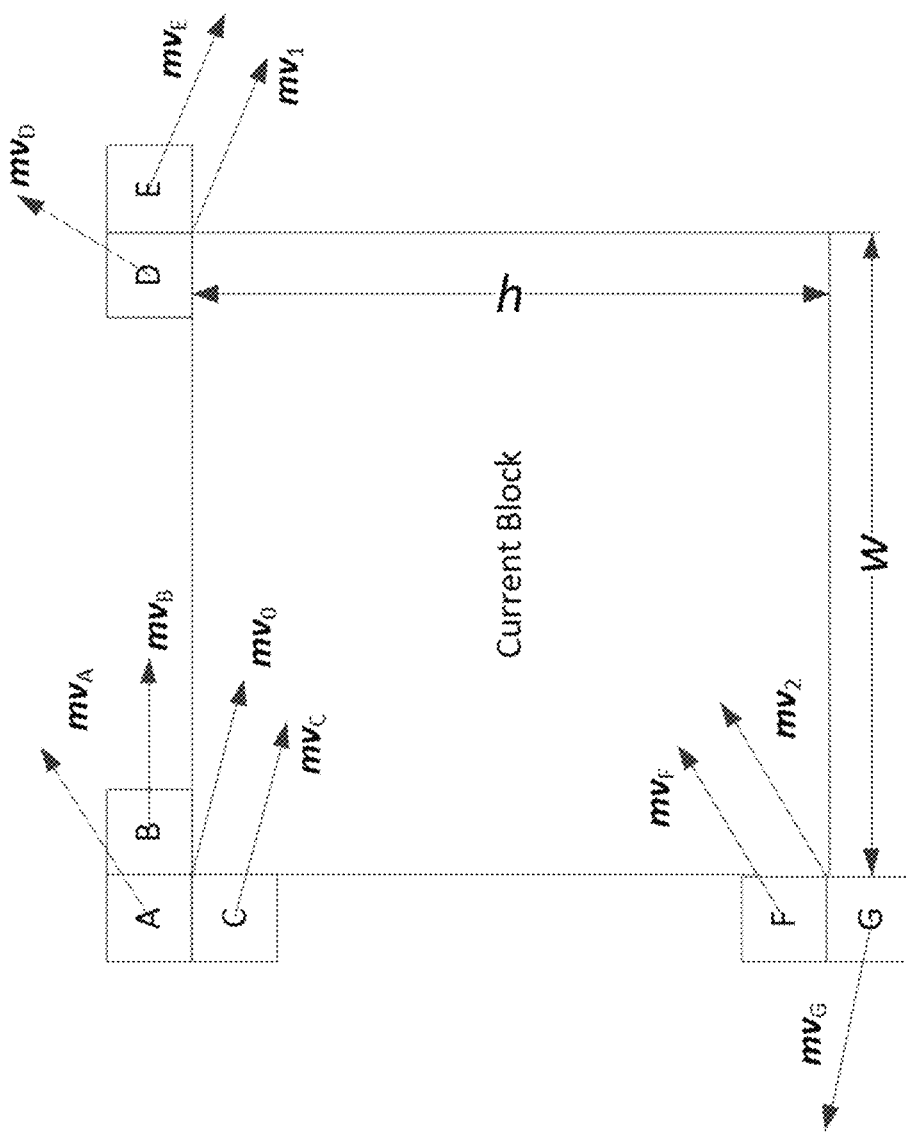
FIG. 17 shows an example of motion vector prediction for AF_INTER for constructed affine candidates.

A constructed affine motion predictor consists of control-point motion vectors (CPMVs) that are derived from neighboring inter coded blocks, as shown in FIG. 17, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.
1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

Figure 15B:
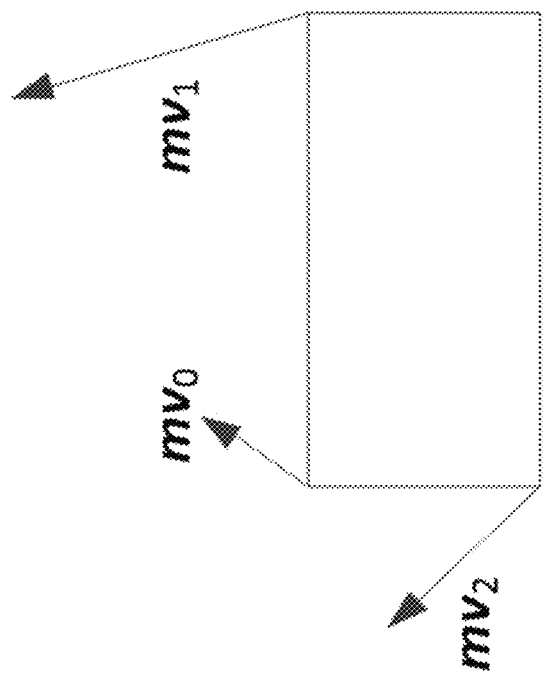
FIGS. 15A and 15B show examples of the simplified 4-parameter affine model and the simplified 6-parameter affine model, respectively.
Figure 15A:
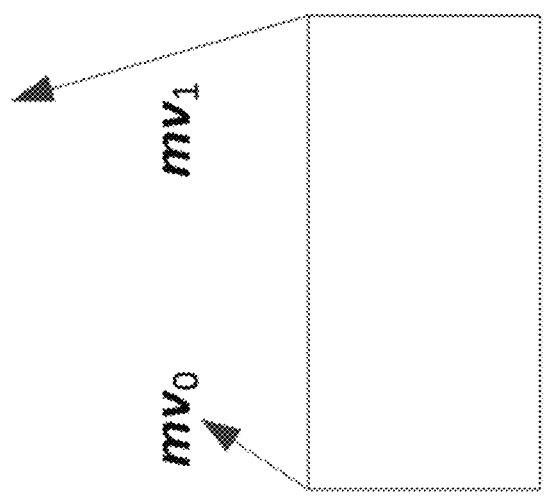

FIG. 15A shows a 4-parameter affine model.

FIG. 15B shows a 6-parameter affine model.

FIG. 16 shows an MVP for AF_INTER for inherited affine candidates.

FIG. 17 shows an MVP for AF_INTER for constructed affine candidates

In AF_INTER mode, when 4/6-parameter affine mode is used, 2/3 control points are required, and therefore 2/3 MVD needs to be coded for these control points, as shown in FIG. 15. It is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 15B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.3.3 AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 18A (denoted by A, B, C, D, E in order). For example, if the neighbour left bottom block is coded in affine mode as denoted by A0 in FIG. 18B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

FIG. 18A-18B show example candidates for AF_MERGE (18A—five neighboring blocks, 18B—CPMV predictor derivation).

An affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.
 a) The motion information for the control points is derived firstly from the specified spatial neighbors and temporal neighbor shown in FIG. 19. CPk (k=1, 2, 3, 4) represents the k-th control point. A0, A1, A2, B0, B1, B2 and B3 are spatial positions for predicting CPk (k=1, 2, 3); T is temporal position for predicting CP4. The coordinates of CP1, CP2, CP3 and CP4 is (0, 0), (W, 0), (H, 0) and (W, H), respectively, where W and H are the width and height of current block.

Figure 19:
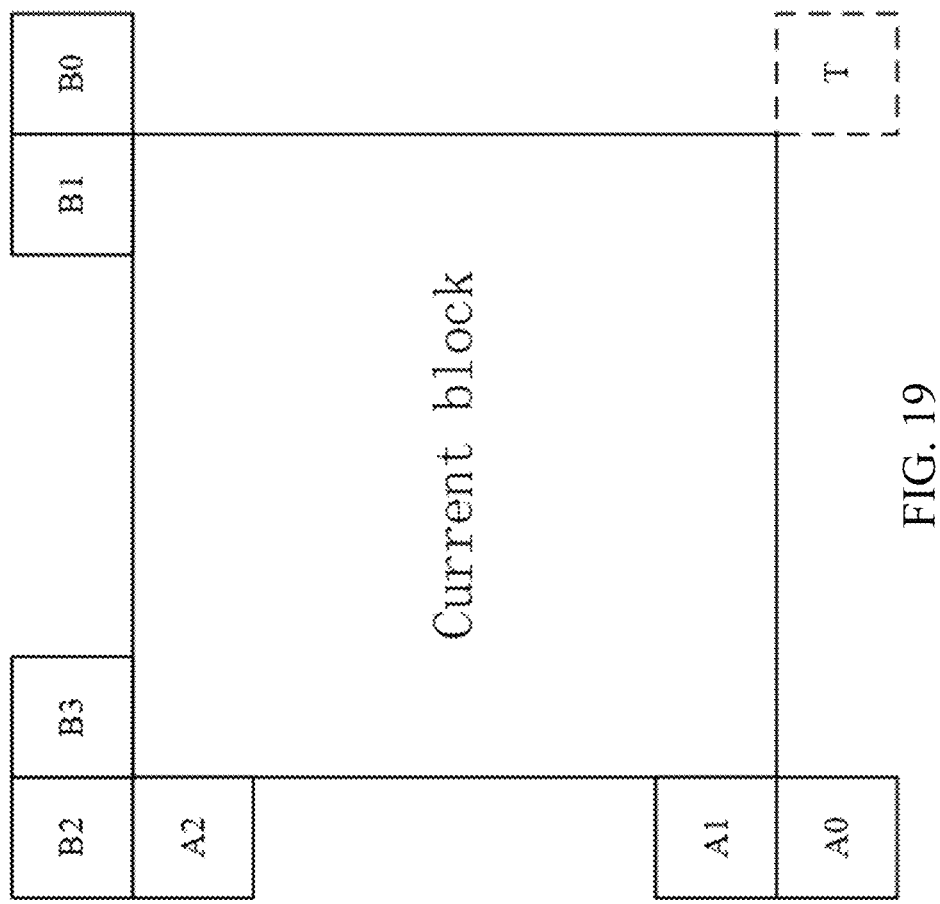
FIG. 19 shows an example of candidate positions for affine merge mode.

FIG. 19 shows an example of candidates position for affine merge mode.

The motion information of each control point is obtained according to the following priority order:
 For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.
 For CP2, the checking priority is B1→B0.
 For CP3, the checking priority is A1→A0.
 For CP4, T is used.
 b) Secondly, the combinations of controls points are used to construct an affine merge candidate.
  I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.
  II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3}
   i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.2.4 Current Picture Referencing

Intra block copy (a.k.a. IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 20.

Figure 20:
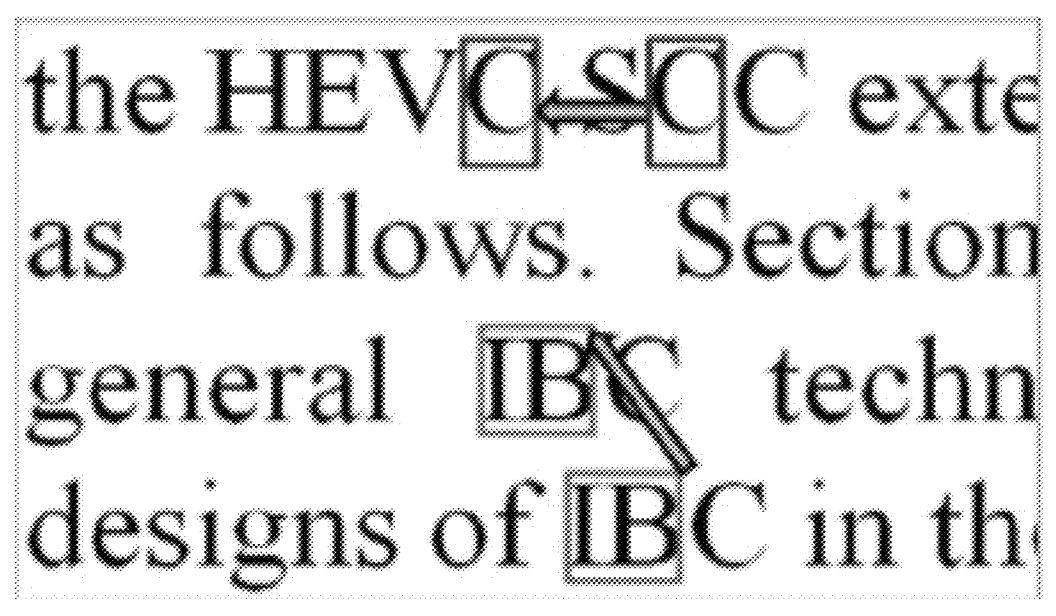

FIG. 20 shows an example of intra-picture block copy.

Similar to the design of CRP in HEVC SCC, In VVC, The use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Main features:

It is treated as a special inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise an normal inter mode coded one with different pictures as reference pictures.

The motion vector for the IBC mode, also referred as block vector, is coded with integer-pel precision, but stored in memory in 1/16-pel precision after decoding as quarter-pel precision is required in interpolation and deblocking stages. When used in motion vector prediction for the IBC mode, the stored vector predictor will be right shifted by 4.

Search range: it is restricted to be within the current CTU.

CPR is disallowed when affine mode/triangular mode/GBI/weighted prediction is enabled.

2.2.5 Merge List Design in VVC

There are four different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. Uni-Prediction TPM merge list size is fixed to be 5.

3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6. MMVD, 4) IBC merge list: it is done in a similar way as the regular merge list.

2.2.5.1 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

The sub-block merge candidate list is filled with candidates in the following order:

a. ATMVP candidate (maybe available or unavailable);
b. Affine merge lists (including Inherited Affine candidates; and Constructed Affine candidates)
c. Padding as zero MV 4-parameter affine model 2.2.5.1.1 ATMVP (Aka Sub-Block Temporal Motion Vector Predictor, SbTMVP)

Basic idea of ATMVP is to derive multiple sets of temporal motion vector predictors for one block. Each sub-block is assigned with one set of predictor. When an ATMVP merge candidate is generated, the following process is applied:

a. Check neighbouring blocks A1 as shown in FIG. 2 in order, to find the first inter-coded, but not CPR-coded block, denoted as block X;
b. Initialize TMV=(0,0). If there is a MV (denoted as MV') of block X, referring to the collocated reference picture (as signaled in the slice header), TMV is set equal to MV'.
c. Suppose the center point of the current block is (x0, y0), then locate a corresponding position of (x0,y0) as M=(x0+MV'x, y0+MV'y) in the collocated picture. Find the block Z covering M.
   i. If Z is intra-coded, then ATMVP is unavailable;
   ii. If Z is inter-coded, MVZ_0 and MVZ_1 for the two lists of block Z are scaled to (Reflist 0 index 0) and (Reflist 1 index 0) as MVdefault0, MVdefault1, and stored.
d. For each 8×8 sub-block, suppose its center point is (xS, yS), then locate a corresponding position of (x0S, y0S) as MS=(x0S+MV'x, y0S+MV'y) in the collocated picture. Find the block ZS covering MS.
i. If ZS is intra-coded, MVdefault0, MVdefault1 are assigned to the sub-block;
ii. If ZS is inter-coded, MVZS_0 and MVZS_1 for the two lists of block ZS are scaled to (Reflist 0 index 0) and (Reflist 1 index 0) and are assigned to the sub-block;

2.2.5.2 Regular Merge List

Different from the merge list design, in VVC, the history-based motion vector prediction (HMVP) method is employed.

Figure 21:
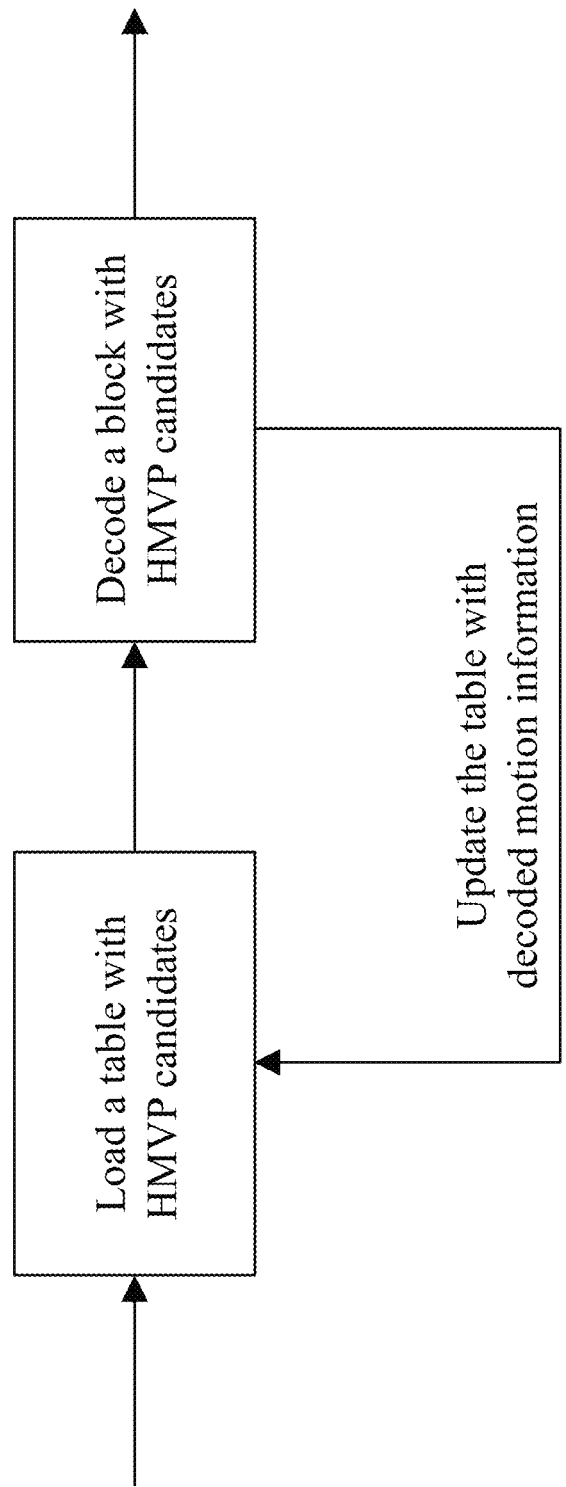
FIG. 21 shows example candidates position for affine merge mode.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 21.

Figure 22:
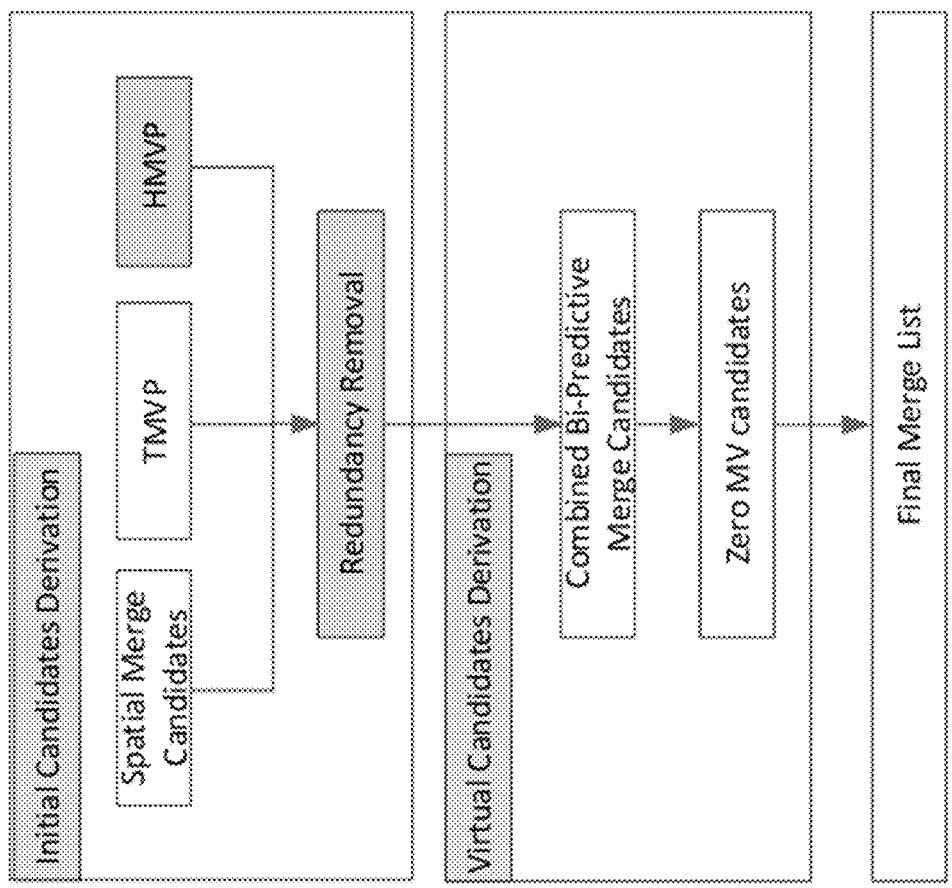
FIG. 22 shows a modified merge list construction process.

HMVP candidates could be used in both AMVP and merge candidate list construction processes. FIG. 22 depicts a modified merge candidate list construction process (highlighted in blue). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.5.3 IBC Merge List

When IBC is added, HMVP candidates are also applicable for the IBC merge list.

More specifically, another 5 IBC candidates may be stored. In current implementation, the regular and IBC candidates are stored in the same HMVP table. However, they are utilized and updated independently. The first M (M<=5) candidates are for the usage of regular merge/AMVP list; and the remaining N candidates (N<=5) are for the usage of IBC mode. Two counters are maintained to indicate how many regular motion candidates and how many IBC motion candidates in the HMVP table. Therefore, it is equal to use 2 HMVP tables, one is for the regular merge modes, and the other for the IBC mode.

Share same process as in regular MV merge, but disallow TMVP, zero vector means unavailable as it is invalid. It is noted that for a spatial neighboring block, only if it is coded with IBC mode, the associated motion information may be added to the IBC merge list. Meanwhile, for the HMVP part, only the last few HMVP candidates (which are stored IBC motion candidates) may be considered in the IBC merge list.

2.2.6 Shared Merge List

To reduce the decoder complexity and support parallel encoding, it proposed to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:
If the block has luma samples no larger than 32, and split to 2 4×4 child blocks, sharing merge lists between very small blocks (e.g. two adjacent 4×4 blocks) is used.
If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to regular merge mode.

2.2.6.1 HMVP Table Updating and Usage

A temporary HMVP table is allocated. Before, the original HMVP table must be copied to the temporary HMVP table when entering the first CU of one shared region.

Figure 23:
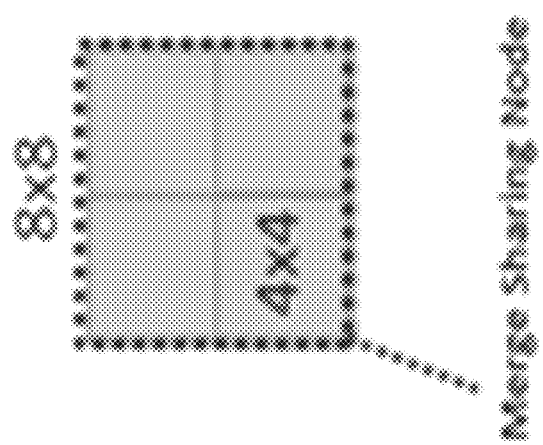
FIG. 23 shows an example of merge sharing node.

In the example shown in FIG. 23, one 8×8 is QT partitioned into 4 4×4 CUs. Before doing the first CU (e.g., the left-top 4×4 CU), the history list must be copied into the temporary HMVP table (HmvpCandListShared[ ]), and, when each 4×4 inside the shared parent (merge sharing node in the figure) need the history list for merge mode, it will use motion candidates in the temporary HMVP table.

However, after decoding one 4×4 CU, the original HMVP table is updated accordingly.

FIG. 23 shows an example of merge sharing node.

2.2.6.2 Virtual Pipeline Data Units (VPDUs)

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied, as shown in:
TT split is not allowed for a CU with either width or height, or both width and height equal to 128.
For a 128×N CU with N≤64 (i.e. width equal to 128 and height smaller than 128), horizontal BT is not allowed.
For a N×128 CU with N≤64 (i.e. height equal to 128 and width smaller than 128), vertical BT is not allowed.

Figure 24:
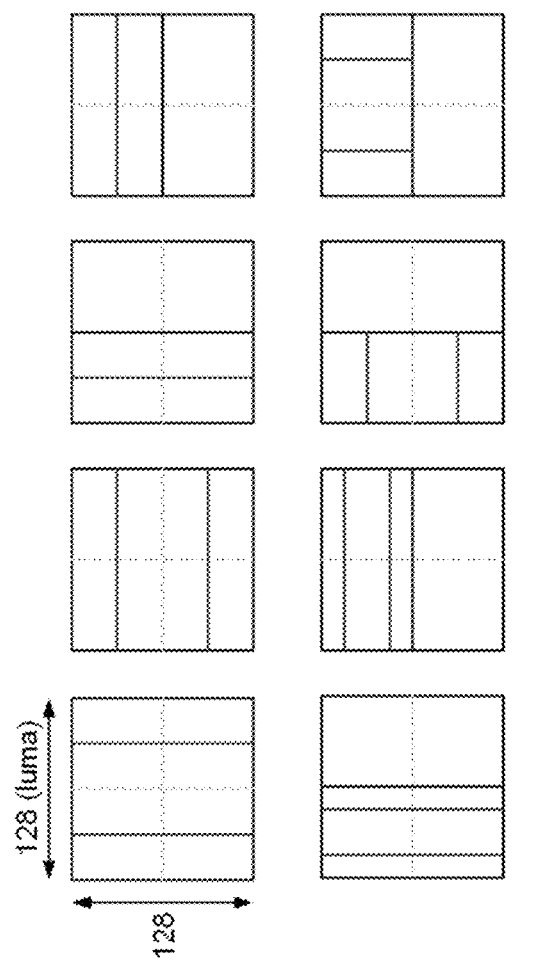
FIG. 24 shows examples of disallowed ternary tree TT and binary tree BT partitioning.

FIG. 24 shows examples of disallowed TT and BT partitioning.

3. Examples of Problems Solved by Embodiments Described in the Present Document

The current design of merge list with HMVP has the following problems:
1) The HMVP table for coding current CTU only contains motion information in previous CTUs in the same CTUs since it is reset at the beginning of a new CTU new. Therefore, it couldn't utilize the motion information from above CTUs.
2) HMVP table is always reset in beginning of each CTU row due to parallelism).
3) Some motion information in HMVP table may be the same as the spatial motion information already added into merge list.

4) HMVP table is currently being used in either regular merge list or IBC merge list. History-based motion information can be used more widely in different merge list.

4. Example Techniques and Embodiments

The detailed techniques below should be considered as examples to explain general concepts. These techniques should not be interpreted in a narrow way. Furthermore, these techniques can be combined in any suitable manner.
1. Multiple HMVP tables may be stored in the encoding/decoding process and before encoding/decoding one block, an HMVP table may be initialized according to the selected HMVP tables.
   a. In one example, after encoding/decoding a first region (e.g., one CTU or VPDU), the associated HMVP table (e.g., before encoding/decoding a second region) may be stored associated with the first region.
   b. In one example, an HMVP table for encoding/decoding the current region may be initialized based on multiple HMVP tables of neighboring regions.
   c. In one example, an HMVP table for encoding/decoding the current region may be initialized based on one HMVP table of a neighboring region.
   d. In one example, the HMVP tables (not limited to left only) of neighboring regions may be that associated from left, top, top left, or top right region of current region.
   e. Alternatively, the HMVP tables (not limited to left only) of neighboring regions may be that associated from top or top right region of current region.
2. A new HMVP table for encoding/decoding one region may be generated according to multiple HMVP tables associated with other regions.
   a. Inherited motion information from multiple tables can be combined into a new HMVP table.
   b. In one example, one combining order is to add all motion information from the first table, and then add all motion information from second table, and add all from $3^{rd}$ table, sequentially, etc. al.
      i. In one example, one combining order is to add all motion information from the first table, and then add all motion information from second table, and so on sequentially.
      ii. Alternatively, a combining order is to add one from first table and take next one from second table, take next one from $3^{rd}$ table, etc. al, repeatedly (interleaved between the first, the second, and 3rd tables).
      iii. Alternatively, a combining order is to add one from first table and take next one from second table repeatedly only with limited tables (interleaved between the first and the second tables).
   c. In one example, one new HMVP table is to combine HMVP tables of left and top right regions.
   d. In one example, one new HMVP table is to combine HMVP tables of left, top, top left, and top right regions.
3. Motion information in HMVP tables of other regions may be pruned out first optionally before being added the motion information into the new HMVP table.
   a. When motion information next to the current CTU (i.e., left column buffer) exists in left HMVP table, it can be pruned out. The pruning of HMVP merge/AMVP candidates can be skipped when a CU locates at the left boundary of the CTU.
      i. In one example, when the motion information stored in any of the entries of the HMVP table matches to any one of the motion information from the left column, it is removed from the HMVP table.
      ii. In one example, when the motion information stored in any of the entries of the HMVP table are within a certain amount of distance to any one of the motion information from the left column, it is removed from the HMVP table. The distance metrics can include but not limited to the L1-norm and the L2-norm. In addition, the threshold for determining such pruning occurs or not can be determined based on the threshold (e.g., block size or distance). In another example, such threshold can be signaled in the SPS/PPS/Tile Group header.
   b. When motion information above to the current CTU (i.e., above line buffer) exists in top HMVP table, it can be pruned out. The pruning of HMVP merge/AMVP candidates can be skipped when a CU locates at the top boundary of the CTU.
4. Constructed motion information from two different tables may be added to a new HMVP table.
   a. Each motion information in HMVP table has location information such as x and y offset from top left corner of current CTU and a flag indicating that it is motion information of current CTU or not. Alternatively, there is a CTU-level syntax element indicating motion information from either the top or the left CTU should be used.
   b. Generate the new motion information with one motion information from left CTU and another motion information from top CTU which is available in HMVP table.
      i. New motion information considering top left corner can be derived based on its distance of two motion information of HMVP tables. One example is as follows. Assume that motion information of blue colored CU in left and top CTU is in HMVP table as below.

Figure 25:
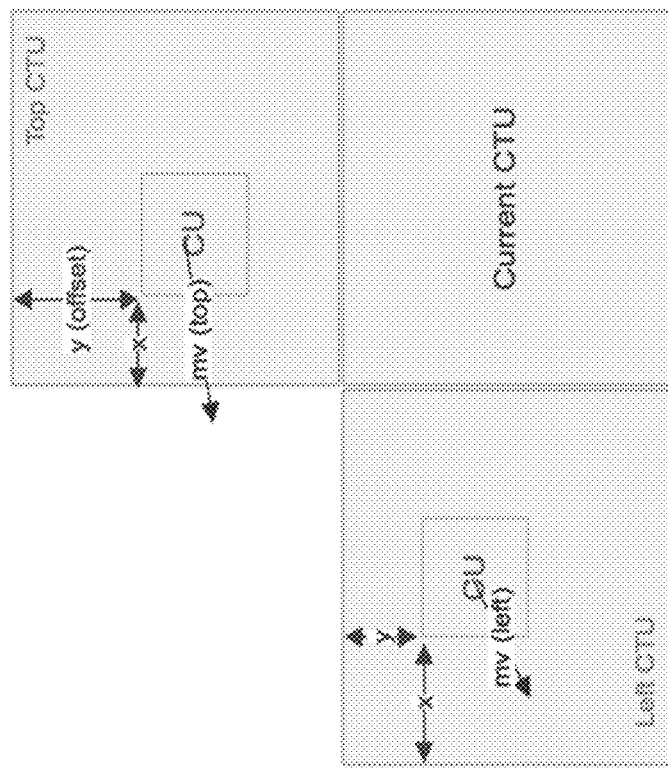
FIG. 25 shows an example of how new motion information can be constructed from neighboring motion information.

FIG. 25 shows an example of how new motion information can be constructed from neighboring motion information.

$$DiffMVx = TopMVx - LeftMVx$$

$$DiffMVy = TopMVy - LeftMVy$$

$$MVx = LeftMVx + DiffMVx * \left(\frac{CTUSIZE - LeftXOffset}{CTUSIZE - LeftXOffset + TopXOffset}\right)$$

$$MVy = LeftMVy + DiffMVy * \left(\frac{LeftYOffset}{CTUSIZE - TopYOffset + LeftYOffset}\right)$$

5. One variation for constructed motion information may be considered to a candidate of merge list in each CU considering its position.
   a. Two motion information may be chosen with any combination of different neighboring HMVP tables including current HMVP table. Below are some examples and it is not limited to only those combination.
      i. First example is one from left and another from top HMVP table.
      ii. Second example is one from left and another from current HMVP table.

iii. Third example is one from top and another from current HMVP table.

iv. Fourth example is both from current HMVP tables.

b. Constructed motion information in CU may be used as a candidate of various merge list, which is not currently used. One example is triangle merge list.

c. Below is one example to construct new motion information with two motion information from left and top HMVP table. The distance metrics may include but not limited to the L1-norm and the L2-norm. DiffMVx and DiffMVy is same in 5.b.

Figure 26:
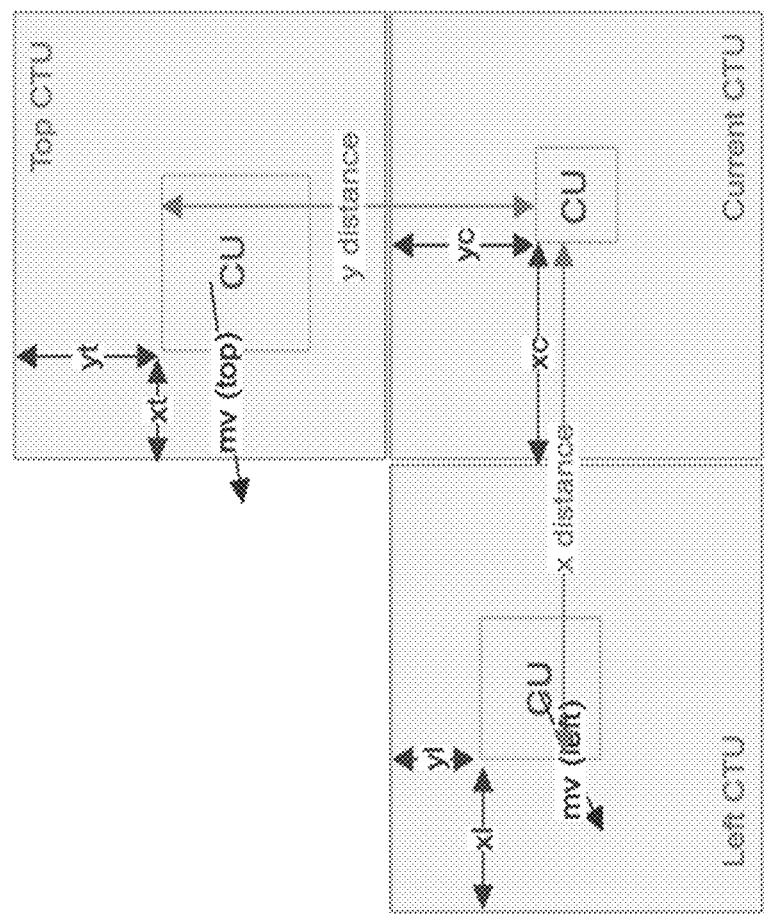
FIG. 26 shows an example of how motion information can be constructed from neighboring motion information.

FIG. 26 shows an example of how motion information can be constructed from neighboring motion information.

$$Xdistance = CTUSIZE - xl + xc$$

$$Ydistance = CTUSIZE - yt + yc$$

$$MVx = LeftMVx + DiffMVx * \left( \frac{Xdistance}{CTUSIZE - LeftXOffset + TopXOffset} \right)$$

$$MVy = LeftMVy + DiffMVy * \left( \frac{Ydistance}{CTUSIZE - TopYOffset + LeftYOffset} \right)$$

6. When a sub-CTU level parallel processing is available, e.g. VPDU or parallel processing size (i.e., predefined area or any size defined in SPS/PPS/Tile Group header), the aforementioned techniques may be applied to each sub-CTU row or parallel processing size.

a. In one example, the HMVP table is reset at the beginning of each sub-CTU row within the tile group.

b. In one example, the inherited HMVP tables from top-left, top, and top-right sub-CTU should be available for constructing the new HMVP table for the current sub-CTU.

c. In one example, only the inherited HMVP tables from top-left and top sub-CTU area should be available for constructing the new HMVP table for the current sub-CTU area.

d. In one example, any combinations of HMVP tables from left, top-left, top, and top-right sub-CTU areas may be used to construct the new HMVP table for the current sub-CTU area.

7. In order to improve the parallel processing in each VPDU or parallel processing size (predefined area or size defined in SPS/PPS/Tile Group header), HMVP table can be generated with any method described above and it is used in current parallel processing size without updating.

8. HMVP tables associated with regions (such as left, top, top left, and top right CTUs or sub-CTUs or parallel processing size) may use memory compression (e.g., mantissa+exponent) to save the bandwidth reading from DDR memory.

5 Example Implementations of the Disclosed Technology

Figure 27:
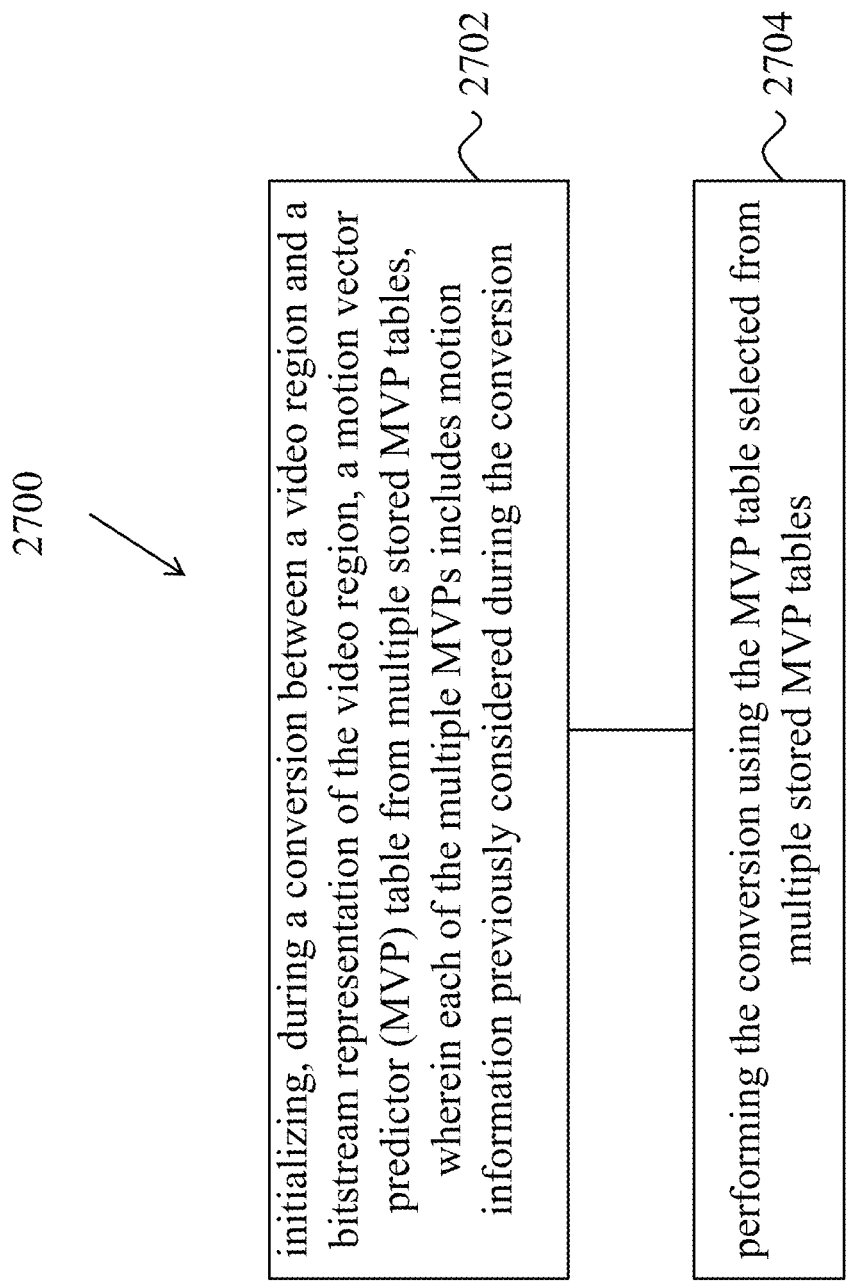
FIG. 27 shows a flowchart of yet another example method for video processing.

FIG. 27 is a flowchart showing an example method 2700 of video processing. The method includes initializing (2702), during a conversion between a video region and a bitstream representation of the video region, a motion vector predictor (MVP) table from multiple stored MVP tables, wherein each of the multiple MVPs includes motion information previously considered during the conversion; and performing (2704) the conversion using the MVP table selected from multiple stored MVP tables.

Figure 28:
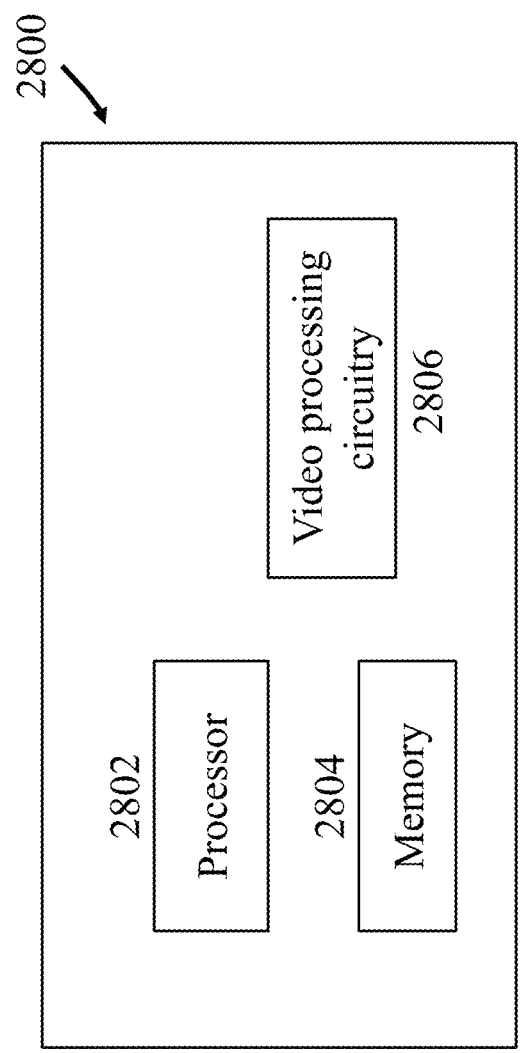
FIG. 28 is a block diagram of an example of a hardware platform for implementing a visual media decoding or a visual media encoding technique described in the present document.

FIG. 28 is a block diagram of a video processing apparatus 2800. The apparatus 2800 may be used to implement one or more of the methods described herein. The apparatus 2800 may be embodied in a smartphone, tablet, computer, Internet of Things (IoT) receiver, and so on. The apparatus 2800 may include one or more processors 2802, one or more memories 2804 and video processing hardware 2806. The processor(s) 2802 may be configured to implement one or more methods described in the present document. The memory (memories) 2804 may be used for storing data and code used for implementing the methods and techniques described herein. The video processing hardware 2806 may be used to implement, in hardware circuitry, some techniques described in the present document.

The following clause-based description provides additional embodiments.

1. A method for video processing, comprising: initializing, during a conversion between a video region and a bitstream representation of the video region, a motion vector predictor (MVP) table from multiple stored MVP tables, wherein each of the multiple MVPs includes motion information previously considered during the conversion; and performing the conversion using the MVP table selected from multiple stored MVP tables.

2. The method of clause 1, further including: associating the MVP table with the video region; and storing the MVP table for subsequent use during the conversion.

3. The method of any of clauses 1-2, wherein the initializing the MVP table includes initializing the MVP table using one or more MVP tables of neighboring video regions.

4. The method of clause 3, wherein the neighboring video regions include a left region of the video region.

5. The method of clause 3, wherein the neighboring video regions include a top-left region of the video region.

6. The method of clause 3, wherein the neighboring video regions include a top-right region of the video region.

7. The method of clause 3, wherein the neighboring video regions include a top region of the video region.

8. The method of any of clauses 1 to 7, wherein the MVP table is initialized as a combination of some of the multiple MVP tables.

9. The method of clause 8, wherein the MVP table is initialized using inherited motion information from the some of the multiple MVP tables.

10. The method of any of clauses 8 or 9, wherein the MVP table is generated by adding from the some of the multiple MVP tables in a pre-defined order.

11. The method of clause 10, wherein the pre-defined order specifies adding all motion information of a first MVP table followed by all motion information of a second table until all MVP information from the some of the multiple tables is added.

12. The method of clause 10, wherein the pre-defined order specifies to add a first motion information from all of the some of multiple MVP tables, followed by a second motion information from all of the some of multiple MVP tables, until all motion information from the some of multiple MVP tables is added.

13. The method of clause 1, wherein the initializing includes selectively pruning motion information from the multiple MVP tables based on a pruning criterion.

14. The method of clause 13, wherein the pruning criterion specifies to prune out motion information of a next coding tree unit of the video region.

15. The method of clause 13, wherein the pruning criterion specifies to skip pruning of merge and alternate MVP candidates for the video region that meets skipping criterion at a left or top boundary of a coding tree unit of the video.

16. The method of clause 15, wherein the skipping criterion specifies the distance to indicate how far apart from a current video region.

17. The method any of clauses 13-16, wherein the pruning criterion specifies to skip adding a new motion information to the MVP table in a case that the new motion information matches that of an entry from a left column of the video region.

18. The method of any of clauses 13-17, wherein the pruning criterion specifies to prune out motion information in a top MVP table corresponding to motion information above a current coding tree unit of the video region.

19. A method for video processing, comprising: constructing, during a conversion between a video region and a bitstream representation of the video region, one or more entries of a motion vector predictor (MVP) table from one or more stored MVP tables, wherein each MVP table includes motion information previously considered during the conversion, a flag indicating motion information is inherited from previous MVP table or added in a current region as a new motion information; and performing the conversion using the MVP table selected from multiple stored MVP tables.

20. The method of clause 19, further including, storing, after the conversion, the one or more entries of the MVP table by associating the MVP table with the video region, wherein, the storing includes storing location information for each motion information in the MVP table.

21. The method of clause 20, wherein the location information includes an (x,y) location of a top left corner of a coding tree unit of the video region.

22. The method of clause 19, wherein the constructing includes deriving a new motion information of one entry of the MVP table using a first motion information from a left coding tree unit to left of the video region and a second motion information from a top coding tree unit to top of the video region.

23. The method of clause 19, wherein the constructing includes deriving a new motion information of one entry of the MVP table using a first motion information from a left coding tree unit to left of the video region and a second motion information from an entry from the MVP table of the video region.

24. The method of any of clauses 19-23, wherein deriving a new motion information is used to construct MVP table at a coding tree unit of the video region.

25. The method of any of clauses 19-23, wherein deriving a new motion information is used to construct MVP table at sub-coding tree unit of the video region.

26. The method of any of clauses 1 to 25, wherein the video region corresponds to a sub-coding tree unit region and wherein the conversion includes initializing the MVP table in parallel with other MVP tables of other video regions in the coding tree unit of the video region.

27. The method of any of clauses 1 or 19, wherein the MVP table is reset at beginning of each sub-coding tree unit row in a tile group of the video.

28. The method of any of clauses 1 to 27, further including: updating, after the conversion, the MVP table.

29. The method of any of clauses 1 to 27, wherein due to the video region being a sub-coding unit level region, using the MVP table and used in a virtual data pipeline unit without updating the MVP table.

30. The method of any of clauses 1 to 29, wherein the video region comprises a video block.

31. The method of any of clauses 1 to 30, wherein the conversion comprises generating the bitstream representation from the video region or generating the video region from the bitstream representation.

32. An apparatus comprising a processor configured to implement the method in any one of clauses 1 to 31.

33. A computer readable media having stored thereon a processor-implementable program code for implementing a method recited in any of clauses 1 to 31.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Figure 29:
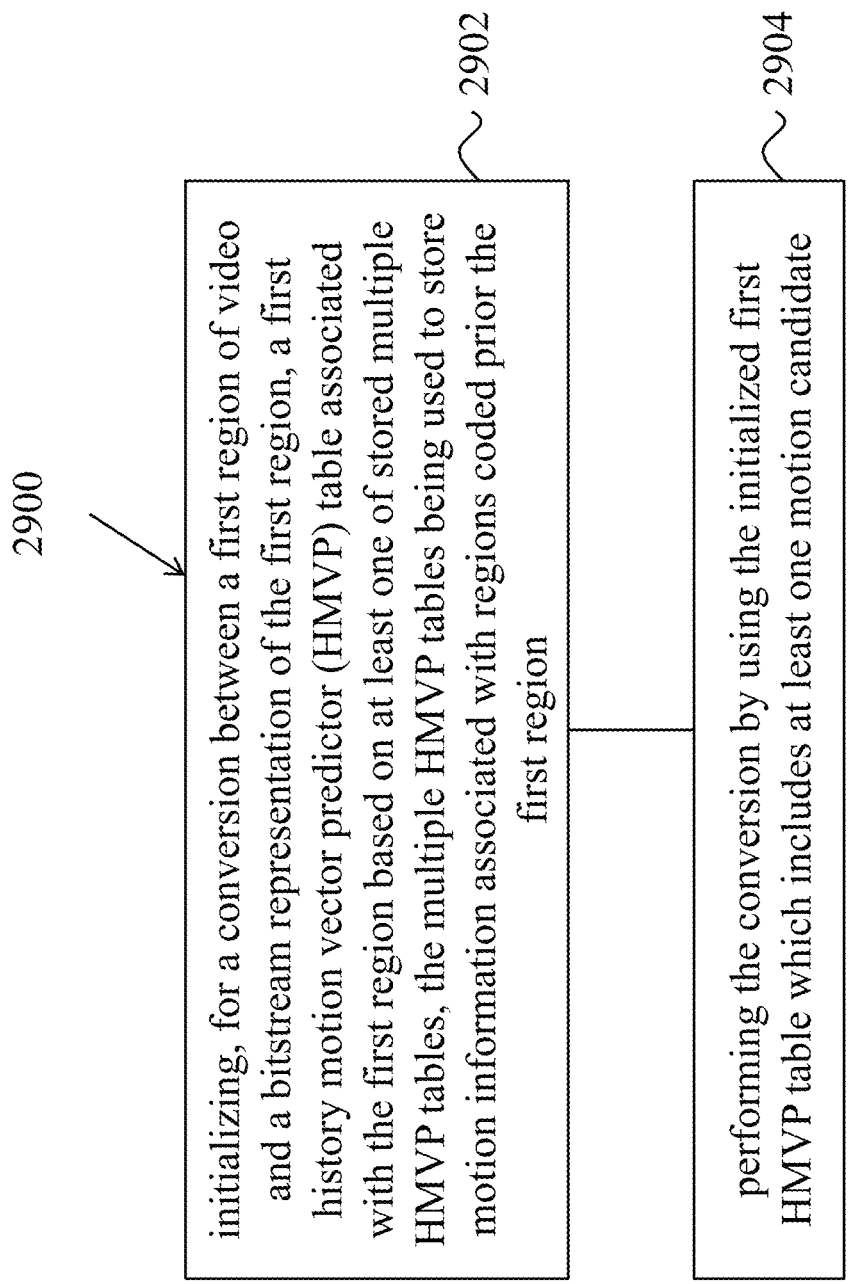
FIG. 29 shows a flowchart of yet another example method for video processing.

FIG. 29 is a flowchart for an example method 2900 of video processing. The method 2900 includes initializing (2902), for a conversion between a first region of video and a bitstream representation of the first region, a first history motion vector predictor (HMVP) table associated with the first region based on at least one of stored multiple HMVP tables, the multiple HMVP tables being used to store motion information associated with regions coded prior the first region; and performing (2904) the conversion by using the initialized first HMVP table which includes at least one motion candidate.

In some examples, the multiple HMVP tables include one or multiple HMVP tables associated with neighboring regions of the first region.

In some examples, the first HMVP table is initialized based on the multiple HMVP tables associated with neighboring regions of the first region.

In some examples, the first HMVP table is initialized based on one HMVP table associated with a neighboring region of the first region.

In some examples, the multiple HMVP tables associated with neighboring regions of the first region include at least one of HMVP table associated with a left region, HMVP table associated with a top region, HMVP table associated with a top left region, and HMVP table associated with a top right region of the first region.

In some examples, the multiple HMVP tables associated with neighboring regions of the first region include HMVP table associated with a top region and/or HMVP table associated with a top right region of the first region.

In some examples, the method further includes: associating the first HMVP table with the first region; and storing the first HMVP table for subsequent use after the conversion of the first region.

In some examples, the region is a coding tree unit (CTU) or a Virtual pipeline data unit (VPDU).

Figure 30:
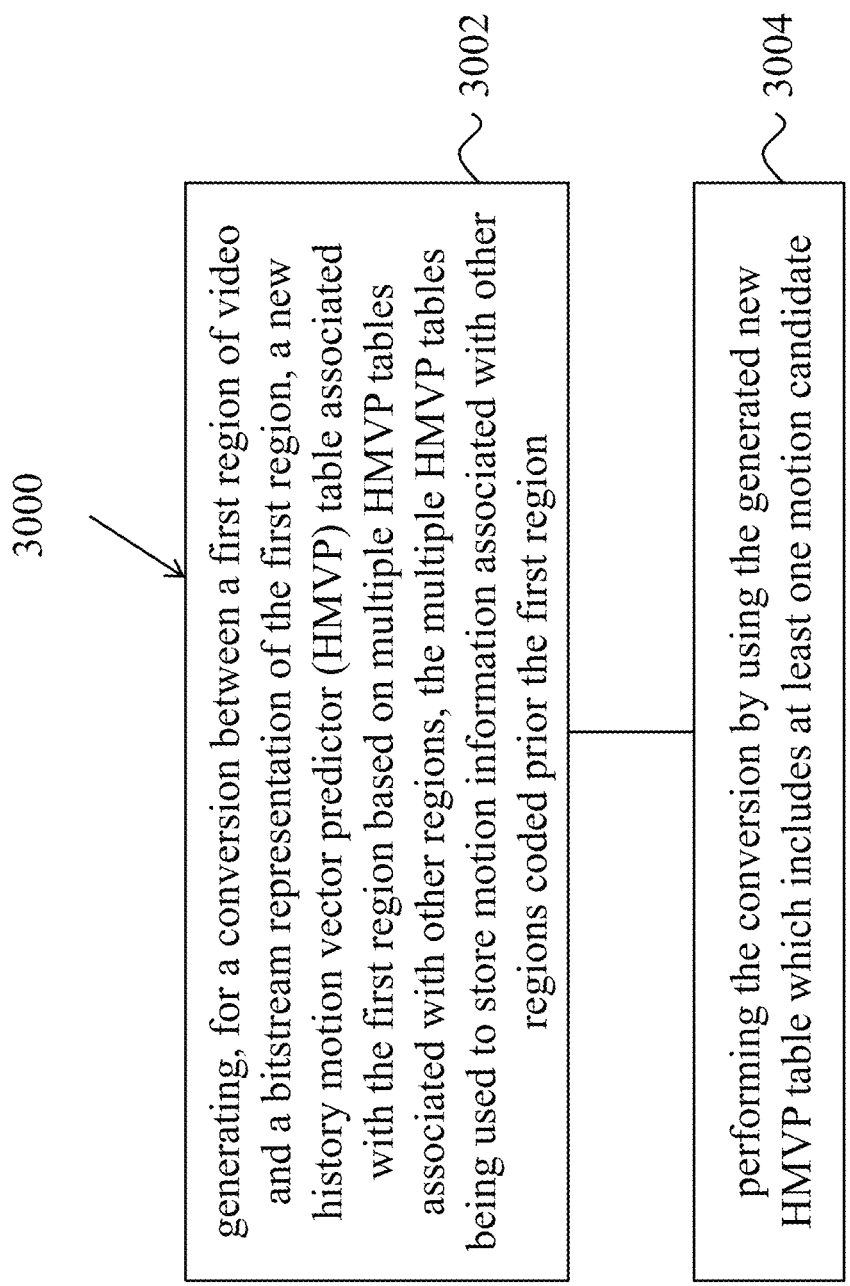
FIG. 30 shows a flowchart of yet another example method for video processing.

FIG. 30 is a flowchart for an example method 3000 of video processing. The method 3000 includes generating (3002), for a conversion between a first region of video and a bitstream representation of the first region, a new history motion vector predictor (HMVP) table associated with the first region based on multiple HMVP tables associated with other regions, the multiple HMVP tables being used to store motion information associated with other regions coded prior the first region; and performing (3004) the conversion by using the generated new HMVP table which includes at least one motion candidate.

In some examples, the region is a coding tree unit (CTU) or a Virtual pipeline data unit (VPDU).

In some examples, inherited motion information from the multiple HMVP tables are combined into the new HMVP table.

In some examples, the new HMVP table is generated by adding all motion information from a predetermined number of HMVP tables of the multiple HMVP tables in a pre-defined order.

In some examples, the pre-defined order is to add all motion information from a first HMVP table, followed by all motion information from a second HMVP table until all motion information from the predetermined number of HMVP tables are added sequentially.

In some examples, the predetermined number is 3.

In some examples, the pre-defined order is to add a first motion information from all of the predetermined number of HMVP tables, followed by a second motion information from all of the predetermined number of HMVP tables, until all motion information from the predetermined number of HMVP tables are interleaved and added.

In some examples, the predetermined number is 2 or 3.

In some examples, the first HMVP table is generated by combing the multiple HMVP tables associated with neighboring regions of the first region.

In some examples, the multiple HMVP tables associated with neighboring regions of the first region include HMVP table associated with a left region, HMVP table associated with a top region, HMVP table associated with a top left region, and HMVP table associated with a top right region of the first region.

In some examples, the multiple HMVP tables associated with neighboring regions of the first region include HMVP table associated with a top region and HMVP table associated with a top right region of the first region.

In some examples, the motion information in the multiple HMVP tables associated with other regions are pruned out based on a pruning criterion before the motion information in the multiple HMVP tables are added to the new HMVP table.

In some examples, when the region is a CTU and the motion information from a left column buffer of the first CTU exists in a left HMVP table associated with a CTU on the left of first CTU, the motion information is pruned out from the left HMVP table, wherein the left column buffer of the first CTU is the right most columns of a left CTU of the first CTU.

In some examples, when a CU locates at a left boundary of the CTU, the pruning of HMVP merge and/or AMVP candidates is skipped.

In some examples, when the motion information stored in any of the entries of the left HMVP table matches to any one of the motion information from the left column buffer of the first CTU, the motion information is removed from the left HMVP table.

In some examples, when the motion information stored in any of the entries of the left HMVP table is within a certain amount of distance to any one of the motion information from the left column buffer of the first CTU, the motion information is removed from the left HMVP table.

In some examples, the distance metrics include at least one of L1-norm and L2-norm, wherein the L1-norm is calculated as the sum of the absolute values of a vector, the L2-norm is calculated as the square root of the sum of the squared vector values.

In some examples, whether the pruning occurs or not is determined based on a threshold, the threshold being associated with size of the first region or the distance.

In some examples, the threshold is signaled in at least one of sequence parameter set (SPS), picture parameter set (PPS) and tile group header.

In some examples, when the region is a CTU and the motion information from an above line buffer of the first CTU exists in a top HMVP table associated with a CTU on the top of first CTU, the motion information is pruned out from the top HMVP table wherein the above line buffer of the first CTU is the bottom most rows of an above CTU of the first CTU.

In some examples, when a CU locates at a top boundary of the CTU, the pruning of HMVP merge and/or AMVP candidates is skipped.

In some examples, a constructed motion information which is constructed from two motion information from two different HMVP tables of the multiple HMVP tables is added to the new HMVP table.

In some examples, each motion information in the HMVP table includes location information including horizontal offset and vertical offset from top left corner of current CTU and a flag indicating that it is motion information of the current CTU or not.

In some examples, a CTU-level syntax element is provided to indicate motion information from either the top or the left CTU is to be used.

In some examples, the constructed motion information is constructed from motion information from a top HMVP table associated with a top region of the first region and motion information from a left HMVP table associated with a left region of the first region.

In some examples, the constructed motion information is constructed based on a difference (DiffMV) between the motion information (TopMV) from the top HMVP table and the motion information (LefMV) from the left HMVP table.

In some examples, the difference (DiffMV) is calculated as following:

$$\text{Diff}MVx = \text{Top}MVx - \text{Left}_{MVx}$$

$$\text{Diff}MVy = \text{Top}MVy - \text{Left}MVy$$

where DiffMVx is a horizontal component of the difference DiffMV, TopMVx is a horizontal component of the motion information TopMV from the top HMVP table, and LefMVx is a horizontal component of the motion information LefMV from the left HMVP table, DiffMVy is a vertical component of the difference DiffMV, TopMVy is a vertical component of the motion information TopMV from the top HMVP table, and LefMVy is a vertical component of the motion information LefMV from the left HMVP table.

In some examples, the constructed motion information MV is calculated as following:

$$MVx = LeftMVx + DiffMVx * \left( \frac{CTUSIZE - LeftXOffset}{CTUSIZE - LeftXOffset + TopXOffset} \right)$$

$$MVy = LeftMVy + DiffMVy * \left( \frac{LeftYOffset}{CTUSIZE - TopYOffset + LeftYOffset} \right)$$

where MVx is a horizontal component of the MV, TopXOffset is a horizontal offset of the motion information TopMV, and LeftXOffset is a horizontal offset of the motion information LefMV, MVy is a horizontal component of the MV, TopYOffset is a vertical offset of the motion information TopMV, and LeftYOffset is a vertical offset of the motion information LefMV, CTUSIZE is width and/or height of the current CTU.

In some examples, a constructed motion information which is constructed from two motion information from one or more HMVP tables of the multiple HMVP tables is used as a candidate of merge list in Coding Unit (CU) of the first region.

In some examples, the two motion information are chosen from any combination of neighboring HMVP tables including current HMVP table.

In some examples, one motion information is from left HMVP table and the other motion information is from top HMVP table.

In some examples, one motion information is from left HMVP table and the other motion information is from the current HMVP table.

In some examples, one motion information is from top HMVP table and the other motion information is from the current HMVP table.

In some examples, the two motion information are both from the current HMVP table.

In some examples, the constructed motion information in the CU is used as a candidate of various merge list, which is not currently used.

In some examples, the various merge list includes a triangle merge list.

In some examples, the constructed motion information is constructed based on a difference (DiffMV) between the motion information (TopMV) from the top HMVP table and the motion information (LefMV) from the left HMVP table and distances between the two motion information and the current CU.

In some examples, the difference (DiffMV) is calculated as following:

$$DiffMVx = TopMVx - LeftMVx$$

$$DiffMVy = TopMVy - LeftMVy$$

where DiffMVx is a horizontal component of the difference DiffMV, TopMVx is a horizontal component of the motion information TopMV from the top HMVP table, and LefMVx is a horizontal component of the motion information LefMV from the left HMVP table, DiffMVy is a vertical component of the difference DiffMV, TopMVy is a vertical component of the motion information TopMV from the top HMVP table, and LefMVy is a vertical component of the motion information LefMV from the left HMVP table, and the distances are calculated as following:

$$Xdistance = CTUSIZE - xl + xc$$

$$Ydistance = CTUSIZE - yt + yc$$

wherein Xdistance is the distance between the motion information LeftMV from the left HMVP table and the current CU, xl is a horizontal distance between the CU associated with the LeftMV and the motion information in the current CU, xc is a horizontal offset of the motion information in the current CU, Ydistance is the distance between the motion information TopMV from the top HMVP table and the current CU, yt is a vertical distance between the CU associated with the TopMV and the motion information in the current CU, yc is a vertical offset of the motion information in the current CU, CTUSIZE is width and/or height of the current CTU.

In some examples, the constructed motion information MV is calculated as following:

$$MVx = LeftMVx + DiffMVx * \left(\frac{Xdistance}{CTUSIZE - LeftXOffset + TopXOffset}\right)$$

$$MVy = LeftMVy + DiffMVy * \left(\frac{Ydistance}{CTUSIZE - TopYOffset + LeftYOffset}\right)$$

where MVx is a horizontal component of the MV, TopXOffset is a horizontal offset of the motion information TopMV, and LeftXOffset is a horizontal offset of the motion information LefMV, MVy is a horizontal component of the MV, TopYOffset is a vertical offset of the motion information TopMV, and LeftYOffset is a vertical offset of the motion information LefMV, CTUSIZE is width and/or height of the current CTU.

In some examples, when a sub-CTU level parallel processing is enabled, the region including a Virtual pipeline data unit (VPDU) or a parallel processing size defined in at least one of SPS, PPS and Tile Group header.

In some examples, the HMVP table is reset at the beginning of each sub-CTU row within the tile group.

In some examples, inherited HMVP tables from one or more of top-left sub-CTU, top sub-CTU, and top-right sub-CTU are available for constructing the new HMVP table for the current sub-CTU.

In some examples, only inherited HMVP tables from top-left sub-CTU and top sub-CTU are available for constructing the new HMVP table for the current sub-CTU.

In some examples, any combinations of HMVP tables from left sub-CTU, top-left sub-CTU, top sub-CTU, and top-right sub-CTU are available for constructing the new HMVP table for the current sub-CTU.

In some examples, the generated HMVP table is used in parallel processing in a Virtual pipeline data unit (VPDU) or a parallel processing size defined in at least one of SPS, PPS and Tile Group header without updating.

In some examples, the HMVP tables associated with regions use memory compression to save bandwidth reading from DDR memory.

In some examples, the memory compress includes mantissa and exponent.

In some examples, the conversion generates the first region of video from the bitstream representation.

In some examples, the conversion generates the bitstream representation from the first region of video.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for processing video data, comprising:
   determining, for a conversion between a first region of video and a bitstream of the first region, a first history motion vector predictor (HMVP) table associated with the first region based on at least one of multiple HMVP tables,
   wherein the multiple HMVP tables include one or multiple HMVP tables associated with neighboring regions of the first region, and the multiple HMVP tables are used to store motion information associated with the neighboring regions coded prior to the first region, or
   wherein the multiple HMVP tables are associated with other regions, the multiple HMVP tables are used to store motion information associated with the other regions coded prior the first region, and the first HMVP table is determined by generating a new HMVP table based on the multiple HMVP tables; and
   performing the conversion by using the determined first HMVP table which includes at least one motion candidate.

2. The method of claim 1, wherein determining the first HMVP table comprises initializing the first HMVP table based on the at least one of the multiple HMVP tables.

3. The method of claim 1, wherein the multiple HMVP tables associated with neighboring regions of the first region include at least one of HMVP table associated with a left region, HMVP table associated with a top region, HMVP table associated with a top left region, and HMVP table associated with a top right region of the first region, or the multiple HMVP tables associated with neighboring regions of the first region include HMVP table associated with a top region and/or HMVP table associated with a top right region of the first region.

4. The method of claim 2, further including:
   associating the first HMVP table with the first region; and
   storing the first HMVP table for subsequent use after the conversion of the first region.

5. The method of claim 1, wherein the first region is a coding tree unit (CTU) or a Virtual pipeline data unit (VPDU).

6. The method of claim 1, wherein inherited motion information from the multiple HMVP tables are combined into the new HMVP table.

7. The method of claim 1, wherein the new HMVP table is generated by combing the multiple HMVP tables associated with the other regions of the first region.

8. The method of claim 1, wherein the motion information in the multiple HMVP tables associated with the other regions are pruned out based on a pruning criterion before the motion information in the multiple HMVP tables are added to the new HMVP table.

9. The method of claim 1, wherein a constructed motion information which is constructed from two motion information from two different HMVP tables of the multiple HMVP tables is added to the new HMVP table.

10. The method of claim 1, wherein a constructed motion information which is constructed from two motion information from one or more HMVP tables of the multiple HMVP tables is used as a candidate of merge list in Coding Unit (CU) of the first region.

11. The method of claim 1, wherein when a sub-CTU level parallel processing is enabled, the first region including a Virtual pipeline data unit (VPDU) or a parallel processing size defined in at least one of SPS, PPS and Tile Group header.

12. The method of claim 11, wherein the first HMVP table is reset at beginning of each sub-CTU row within a tile group.

13. The method of claim 1, wherein the determined first HMVP table is used in parallel processing in a Virtual pipeline data unit (VPDU) or a parallel processing size defined in at least one of SPS, PPS and Tile Group header without updating.

14. The method of claim 1, wherein the multiple HMVP tables use memory compression to save bandwidth reading from DDR memory.

15. The method of claim 1, wherein the conversion includes encoding the first region of video into the bitstream.

16. The method of claim 1, wherein the conversion includes decoding the first region of video from the bitstream.

17. An apparatus for processing video data comprising a processor and a non-transitory memory with instructions thereon, wherein the instructions upon execution by the processor, cause the processor to:
   determine, for a conversion between a first region of video and a bitstream of the first region, a first history motion vector predictor (HMVP) table associated with the first region based on at least one of multiple HMVP tables,
   wherein the multiple HMVP tables include one or multiple HMVP tables associated with neighboring regions of the first region, and the multiple HMVP tables are used to store motion information associated with the neighboring regions coded prior to the first region, or
   wherein the multiple HMVP tables are associated with other regions, the multiple HMVP tables are used to store motion information associated with the other regions coded prior the first region, and the first HMVP table is determined by generating a new HMVP table based on the multiple HMVP tables; and
   perform the conversion by using the determined first HMVP table which includes at least one motion candidate.

18. The apparatus of claim 17, wherein determining the first HMVP table comprises initializing the first HMVP table based on the at least one of the multiple HMVP tables.

19. The apparatus of claim 17, wherein the multiple HMVP tables associated with neighboring regions of the first region include at least one of HMVP table associated with a left region, HMVP table associated with a top region, HMVP table associated with a top left region, and HMVP table associated with a top right region of the first region, or the multiple HMVP tables associated with neighboring regions of the first region include HMVP table associated with a top region and/or HMVP table associated with a top right region of the first region.

20. A non-transitory computer-readable recording medium storing a bitstream of a video which is generated by a method performed by a video processing apparatus, wherein the method comprises:
   determining, for a conversion between a first region of video and a bitstream of the first region, a history motion vector predictor (HMVP) table associated with the first region based on at least one of multiple HMVP tables,
   wherein the multiple HMVP tables include one or multiple HMVP tables associated with neighboring regions of the first region, and the multiple HMVP tables are used to store motion information associated with the neighboring regions coded prior to the first region, or
   wherein the multiple HMVP tables are associated with other regions, the multiple HMVP tables are used to store motion information associated with the other regions coded prior the first region, and the first HMVP table is determined by generating a new HMVP table based on the multiple HMVP tables; and
   performing the conversion by using the determined first HMVP table which includes at least one motion candidate.

\* \* \* \* \*

UNITED STATES PATENT AND TRADEMARK OFFICE
CERTIFICATE OF CORRECTION

| | | |
|---|---|---|
| PATENT NO. | : 11,895,320 B2 | Page 1 of 1 |
| APPLICATION NO. | : 17/486312 | |
| DATED | : February 6, 2024 | |
| INVENTOR(S) | : Jaehong Chon et al. | |

It is certified that error appears in the above-identified patent and that said Letters Patent is hereby corrected as shown below:

On the Title Page

In item (30) Foreign Application Priority Data insert:
-- March 27, 2019 (WO) ............... PCT/CN2019/079826 --, therefor.

Signed and Sealed this
Second Day of July, 2024

Katherine Kelly Vidal
*Director of the United States Patent and Trademark Office*